United States Patent
Segars et al.

(10) Patent No.: US 12,077,906 B2
(45) Date of Patent: Sep. 3, 2024

(54) CARPET TILES AND SYSTEMS AND METHODS OF MAKING SAME

(71) Applicant: COLUMBIA INSURANCE COMPANY, Omaha, NE (US)

(72) Inventors: Jeffery Wayne Segars, Cartersville, GA (US); Jill Glascock Suhm, Marietta, GA (US); Joseph K. Davis, Rockmart, GA (US); William Main, Jr., Adairsville, GA (US)

(73) Assignee: Columbia Insurance Company, Omaha, NE (US)

( * ) Notice: Subject to any disclaimer, the term of this patent is extended or adjusted under 35 U.S.C. 154(b) by 545 days.

(21) Appl. No.: 17/068,108

(22) Filed: Oct. 12, 2020

(65) Prior Publication Data
US 2021/0032808 A1 Feb. 4, 2021

Related U.S. Application Data

(62) Division of application No. 15/941,832, filed on Mar. 30, 2018, now abandoned.
(Continued)

(51) Int. Cl.
*A46D 1/00* (2006.01)
*B32B 5/00* (2006.01)
(Continued)

(52) U.S. Cl.
CPC .......... *D06N 7/0081* (2013.01); *B32B 5/022* (2013.01); *B32B 5/028* (2013.01); *B32B 5/10* (2013.01);
(Continued)

(58) Field of Classification Search
CPC .......... A46D 1/00; B32B 5/00; B32B 37/206; B32B 37/08; B32B 38/0004; B32B 38/08;
(Continued)

(56) References Cited

U.S. PATENT DOCUMENTS 2,391,539 A * 12/1945 Ray ................ B31D 1/021
156/259
3,645,992 A 2/1972 Elston
(Continued)

FOREIGN PATENT DOCUMENTS

JP 2009-131343 6/2009

OTHER PUBLICATIONS

International Search Report and Written Opinion were mailed on Jun. 21, 2018 by the International Searching Authority for International Application No. PCT/US2018/025434, filed on Mar. 30, 2018 (Applicant-Shaw Industries Group, Inc.) (13 Pages).
(Continued)

*Primary Examiner* — Linda L Gray
(74) *Attorney, Agent, or Firm* — Ballard Spahr LLP

(57) ABSTRACT

A carpet tile having a greige good, an adhesive layer, and a secondary backing material. The greige good has a primary backing component and a plurality of fibers attached to the primary backing component. The adhesive layer has an adhesive composition and a reinforcement material that is at least partially embedded within the adhesive composition. The adhesive layer is applied to a back surface of the primary backing component. The secondary backing material is adhered to the primary backing component by contact with a portion of the adhesive composition that flows through the reinforcement material. The reinforcement material and the secondary backing material are co-laminated onto the adhesive composition.

20 Claims, 2 Drawing Sheets

Related U.S. Application Data

(60) Provisional application No. 62/478,885, filed on Mar. 30, 2017.

(51) Int. Cl.
| | | |
|---|---|---|
| *B32B 5/02* | (2006.01) | |
| *B32B 5/10* | (2006.01) | |
| *B32B 7/12* | (2006.01) | |
| *B32B 37/00* | (2006.01) | |
| *B32B 37/08* | (2006.01) | |
| *B32B 37/20* | (2006.01) | |
| *B32B 38/00* | (2006.01) | |
| *B32B 38/08* | (2006.01) | |
| *D06N 7/00* | (2006.01) | |
| *B32B 37/12* | (2006.01) | |
| *B32B 37/24* | (2006.01) | |

(52) U.S. Cl.
CPC .............. *B32B 7/12* (2013.01); *B32B 37/206* (2013.01); *D06N 7/0068* (2013.01); *D06N 7/0078* (2013.01); *B32B 37/08* (2013.01); *B32B 2037/1215* (2013.01); *B32B 37/1284* (2013.01); *B32B 2037/243* (2013.01); *B32B 38/0004* (2013.01); *B32B 38/08* (2013.01); *B32B 2255/26* (2013.01); *B32B 2262/0253* (2013.01); *B32B 2262/0261* (2013.01); *B32B 2262/0284* (2013.01); *B32B 2262/101* (2013.01); *B32B 2305/026* (2013.01); *B32B 2305/08* (2013.01); *B32B 2305/10* (2013.01); *B32B 2305/20* (2013.01); *B32B 2305/28* (2013.01); *B32B 2305/30* (2013.01); *B32B 2309/10* (2013.01); *B32B 2471/02* (2013.01); *D06N 2211/066* (2013.01); *D06N 2213/06* (2013.01); *D10B 2321/022* (2013.01); *D10B 2331/02* (2013.01); *D10B 2331/04* (2013.01)

(58) Field of Classification Search
CPC ...... B32B 2037/1215; B32B 2037/243; B32B 2305/026; B32B 2305/08; B32B 2305/10; B32B 2305/20; B32B 2305/28; B32B 2305/30; B32B 2471/02
See application file for complete search history.

(56) References Cited

U.S. PATENT DOCUMENTS

| | | | |
|---|---|---|---|
| 3,859,151 A * | 1/1975 | Vincent | D06M 23/12 |
| | | | 156/72 |
| 3,873,643 A | 3/1975 | Wu et al. | |
| 3,882,194 A | 5/1975 | Krebaum et al. | |
| 4,076,698 A | 2/1978 | Anderson et al. | |
| 4,230,830 A | 10/1980 | Tanny et al. | |
| 4,320,167 A * | 3/1982 | Wishman | D04H 1/48 |
| | | | 442/403 |
| 4,522,857 A | 6/1985 | Higgins | |
| 4,629,642 A | 12/1986 | Kernstock | |
| 4,782,890 A | 8/1988 | Strait et al. | |
| 4,798,081 A | 1/1989 | Hazlitt et al. | |
| 4,871,603 A | 10/1989 | Malone | |
| 4,927,888 A | 5/1990 | Strait et al. | |
| 4,988,551 A | 1/1991 | Zegler | |
| 5,008,204 A | 4/1991 | Stehling | |
| 5,026,798 A | 6/1991 | Canich | |
| 5,055,438 A | 10/1991 | Canich | |
| 5,064,802 A | 11/1991 | Stevens et al. | |
| 5,272,236 A | 12/1993 | Lai et al. | |
| 5,278,272 A | 1/1994 | Lai et al. | |
| 5,292,845 A | 3/1994 | Kawasaki et al. | |
| 5,545,276 A | 8/1996 | Higgins | |
| 5,677,383 A | 10/1997 | Chum et al. | |
| 5,977,251 A | 11/1999 | Kao et al. | |
| 7,364,634 B1 | 4/2008 | Irwin, Sr. | |
| 7,846,282 B2 * | 12/2010 | Nishio | B32B 25/10 |
| | | | 442/373 |
| 2002/0119281 A1 | 8/2002 | Higgins | |
| 2002/0134486 A1 | 9/2002 | Brumbelow et al. | |
| 2004/0197522 A1 | 10/2004 | Reisdorf | |
| 2005/0287334 A1 | 12/2005 | Wright et al. | |
| 2007/0254131 A1 | 11/2007 | Shail et al. | |
| 2011/0014431 A1 | 1/2011 | Fowler | |
| 2012/0082820 A1 | 4/2012 | Salsman | |
| 2016/0032521 A1 | 2/2016 | Arvidson et al. | |

OTHER PUBLICATIONS

Non-Final Rejection for U.S. Appl. No. 15/941,832, dated May 26, 2020, 31 pages.
Final Rejection for U.S. Appl. No. 15/941,832, dated Jan. 14, 2021.
Non-Final Rejection for U.S. Appl. No. 15/941,832, dated Aug. 17, 2021, 19 pages.
"Fleece Fabric." and "Needlepunching" Complete Textile Glossary. New York, NY: Celanese Acetate, 2001. N. pag. Print. (Year: 2001), 4 pages.

* cited by examiner

CARPET TILES AND SYSTEMS AND METHODS OF MAKING SAME

CROSS-REFERENCE TO RELATED APPLICATION

This application is a divisional of U.S. patent application Ser. No. 15/941,832, filed on Mar. 30, 2018, which claims priority to and the benefit of the filing date of U.S. Provisional Patent Application No. 62/478,885, which was filed on Mar. 30, 2017. Each of these applications is incorporated herein by reference in its entirety.

FIELD

The present invention pertains to carpet tiles and, more particularly, to carpet tiles having adhesive layers including an adhesive composition and a reinforcement material that is at least partially embedded within the adhesive composition.

BACKGROUND

Carpet tiles are typically produced with heavy backings, which contribute to making the carpet tiles stiff and difficult to cut. Such carpet tiles are typically made on narrow-width (2 m or less) backing equipment. Typically, during the manufacture of such carpet tiles, at least two applications of backing adhesive are required to create multiple backing layers.

There is a need for other carpet tile constructions that can be produced more easily and at a lower price than existing carpet tiles.

SUMMARY

In accordance with the purpose(s) of the invention, as embodied and broadly described herein, the invention, in one aspect, relates to a carpet tile comprising a greige good, an adhesive layer, and a secondary backing material. The greige good can have a primary backing component and a plurality of fibers attached to the primary backing component. The primary backing component can have a face surface and a back surface, and the plurality of fibers can extend from the face surface of the primary backing component. The adhesive layer can have a first surface and an opposed second surface. The adhesive layer can comprise an adhesive composition and a reinforcement material that is at least partially embedded within the adhesive composition. The first surface of the adhesive layer can be applied to the back surface of the primary backing component. The secondary backing material can be adhered to the primary backing component by contact with the second surface of the adhesive layer. The reinforcement material can have opposed first and second sides that are spaced apart relative to a vertical axis. The reinforcement material and the secondary backing material can be co-laminated onto the adhesive composition. The reinforcement material can have an open structure that permits flow of the adhesive composition through the reinforcement material from the first side of the reinforcement material to the second side of the reinforcement material, thereby embedding at least a portion of the reinforcement material within the adhesive composition and defining the adhesive layer. Optionally, the carpet tile can further comprise a precoat layer disposed between the back surface of the primary backing component and the adhesive layer.

Also disclosed herein is a method of making a carpet tile. The method can include (a) extruding an adhesive composition onto a back surface of a primary backing component of a greige good. The greige good can further comprise a plurality of fibers attached to the primary backing component and extending from a face surface of the primary backing component. The method can also include (b) co-laminating a reinforcement material and a secondary backing material onto the adhesive composition. The reinforcement material can have an open structure and opposed first and second sides that are spaced apart relative to a vertical axis. The method can further include (c) allowing the adhesive composition to flow through the reinforcement material from the first side of the reinforcement material to the second side of the reinforcement material such that the adhesive composition on the second side of the reinforcement material contacts the secondary backing material. Additionally, the method can include (d) cooling the adhesive composition to define an adhesive layer in which the reinforcement material is at least partially embedded within the adhesive composition. The secondary backing material can be adhered to the primary backing component by contact with the adhesive composition of the adhesive layer.

Additional aspects of the invention will be set forth, in part, in the detailed description, and claims which follow, and in part will be derived from the detailed description, or can be learned by practice of the invention. It is to be understood that both the foregoing general description and the following detailed description are exemplary and explanatory only and are not restrictive of the invention as disclosed.

DETAILED DESCRIPTION

Figure 1:
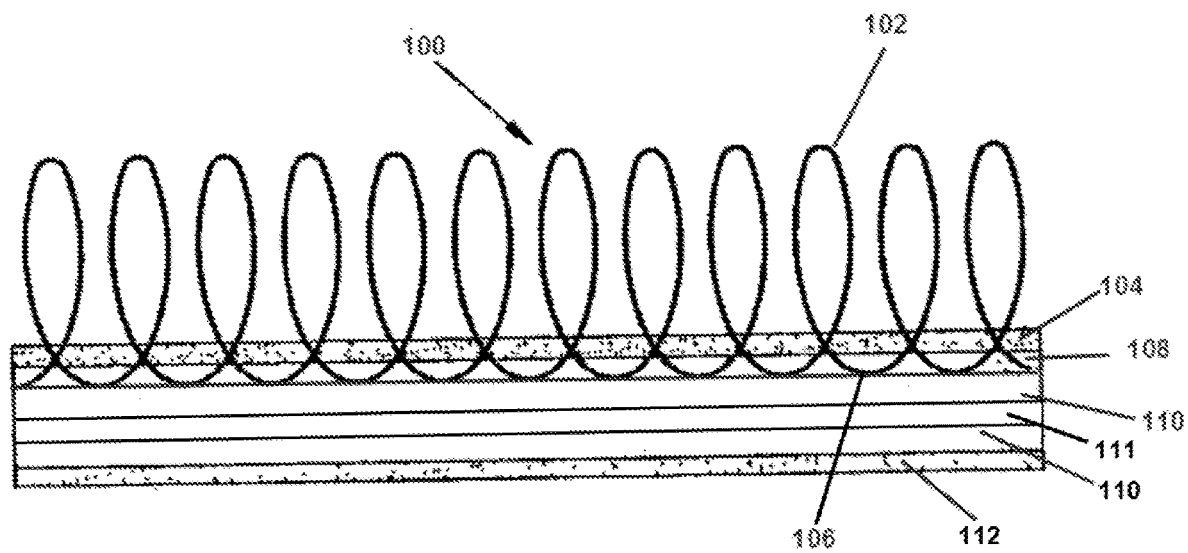
FIG. 1 shows a cross-sectional side view of an exemplary carpet tile as disclosed and described herein.

The present invention can be understood more readily by reference to the following detailed description, examples, drawings, and claims, and their previous and following description. However, before the present compositions, articles, devices, systems, and/or methods are disclosed and described, it is to be understood that this invention is not limited to the specific compositions, articles, devices, systems, and/or methods disclosed unless otherwise specified, as such can, of course, vary. It is also to be understood that the terminology used herein is for the purpose of describing particular aspects only and is not intended to be limiting.

The following description of the invention is also provided as an enabling teaching of the invention in its best, currently known aspect. To this end, those of ordinary skill in the relevant art will recognize and appreciate that changes and modifications can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are thus also a part of the present invention.

Thus, the following description is provided as illustrative of the principles of the present invention and not in limitation thereof.

Various combinations of elements of this disclosure are encompassed by this invention, e.g. combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

It is also to be understood that the terminology used herein is for the purpose of describing particular aspects only and is not intended to be limiting. As used in the specification and in the claims, the term "comprising" may include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used herein, the singular forms "a," "an" and "the" include plural referents unless the context clearly dictates otherwise. Thus, for example, reference to a "reinforcement material" includes aspects having two or more reinforcement materials unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event or circumstance may or may not occur, and that the description includes instances where said event or circumstance occurs and instances where it does not.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

A weight percent of a component, or weight %, or wt. %, unless specifically stated to the contrary, is based on the total weight of the formulation or composition in which the component is included.

"Carpet" is used herein in the manner as would be recognized by one of ordinary skill in the art. The definition of carpet as used herein includes any known in the art carpet products. As used herein, the term "carpet tile" includes any tile that can be formed from a carpet produce. As an example, and without limitation, the term "carpet tile" includes tiles formed from broadloom textile flooring products that are provided in roll form.

The term "oligomer" as used herein refers to a molecule that consists of a few monomer units than a polymer. Exemplary oligomers include dimmers, trimers and tetramers.

The term "fiber" as used herein includes fibers of extreme or indefinite length (i.e. filaments) and fibers of short length (i.e., staple fibers).

The term "yarn" as used herein refers to a continuous strand, length, or bundle of fibers. The fibers can be any type of fiber as described herein.

As used herein, the term "copolymer" refers to a polymer formed from two or more different repeating units (monomer residues). By way of example and without limitation, a copolymer can be an alternating copolymer, a random copolymer, a block copolymer, or a graft copolymer.

The term "linear" as used to describe ethylene polymers is used herein to mean the polymer backbone of the ethylene polymer lacks measurable or demonstrable long chain branches, e.g., the polymer is substituted with an average of less than 0.01 long branch/1000 carbons.

The term "homogeneous ethylene polymer" as used to describe ethylene polymers is used in the conventional sense in accordance with the original disclosure by Elston in U.S. Pat. No. 3,645,992, the disclosure of which is incorporated herein by reference. As defined herein, homogeneous ethylene polymers include both substantially linear ethylene polymers and homogeneously branched linear ethylene.

Homogeneously branched ethylene polymer is homogeneous ethylene polymer that refers to an ethylene polymer in which the monomer or comonomer is randomly distributed within a given polymer or interpolymer molecule and wherein substantially all of the polymer or interpolymer molecules have substantially the same ethylene to comonomer molar ratio with that polymer or interpolymer.

Alternatively, homogeneously branched ethylene polymers can be defined as homogeneous ethylene polymers that possess short chain branches and characterized by a relatively high short chain branching distribution index (SCBDI) or relatively high composition distribution branching index (CDBI). That is, the ethylene polymer has a SCBDI or CDBI greater than or equal to 50 percent, greater than or equal to 70 percent, or greater than or equal to 90 percent and essentially lack a measurable high density (crystalline) polymer fraction.

In the aspects wherein the homogeneously branched ethylene polymers are characterized by the short chain branching distribution index or composition distribution branching index, the SCBDI or CDBI can be defined as the weight percent of the polymer molecules having a comonomer content within 50 percent of the median total molar comonomer content and represents a comparison of the comonomer distribution in the polymer to the comonomer distribution expected for a Bernoullian distribution. The SCBDI or CDBI of polyolefins can be conveniently calculated from data obtained from techniques known in the art, such as, for example, temperature rising elution fractionation (abbreviated herein as "TREF") as described, for example, by Wild et al., *Journal of Polymer Science, Poly. Phys. Ed.*, Vol. 20, p. 441 (1982), L. D. Cady, "The Role of Comonomer Type and Distribution in LLDPE Product Performance," SPE Regional Technical Conference, Quaker Square Hilton, Akron, Ohio, October 1-2, pp. 107-119 (1985), or in U.S. Pat. Nos. 4,798,081 and 5,008,204, the disclosures of all of which are incorporated herein by reference. In some aspects, the comonomer distribution of the polymer and SCBDI or CDBI are determined using $^{13}$CNMR analysis in accordance with techniques described, for example, in U.S. Pat. No. 5,292,845 and by J. C Randall in Rev. Macromol. Chem. Phys., C29, pp. 201-317, the disclosures of which are incorporated herein by reference.

In some aspects, the terms "homogeneously branched linear ethylene polymer" and "homogeneously branched linear ethylene/α-olefin polymer" means that the olefin polymer has a homogeneous or narrow short branching distribution but does not have long chain branching. That is, the linear ethylene polymer is a homogeneous ethylene polymer characterized by an absence of long chain branching. Such polymers can be made using polymerization processes (e.g., as described by Elston in U.S. Pat. No. 3,645,992) which provide a uniform short chain branching distribution (i.e., homogeneously branched). Homogeneously branched linear ethylene polymers are typically characterized as having a molecular weight distribution, $M_w/M_n$, of less than about 3, less than about 2.8, or less than about 2.3. Commercial examples of suitable homogeneously branched linear ethylene polymers include those sold by Mitsui Petrochemical Industries as Tafmer™ resins and by Exxon Chemical Company as Exact™ resins and Exceed™ resins. Alternatively, the terms "homogeneously branched linear ethylene polymer" and "homogeneously branched linear ethylene/α-olefin polymer" means that the olefin polymer has a relatively high SCBDI or CDBI.

The terms "homogeneous linearly branched ethylene polymer" or "homogeneously branched linear ethylene/α-olefin polymer" do not refer to high pressure branched polyethylene which is known to those skilled in the art to have numerous long chain branches. The term "homogeneous linear ethylene polymer" generically refers to both linear ethylene homopolymers and to linear ethylene/α-olefin interpolymers. A linear ethylene/α-olefin interpolymer possesses short chain branching and the α-olefin is typically at least one $C_3$-$C_{20}$ α-olefin (e.g., propylene, 1-butene, 1-pentene, 4-methyl-1-pentene, 1-hexene, and 1-octene). In other aspects the polyethylenes that are suitable for use in the present invention are interpolymers of ethylene with at least one $C_3$-$C_{20}$ α-olefin and/or $C_4$—C diolefin. Copolymers of ethylene and α-olefin of $C_3$-$C_{20}$ carbon atoms can be used.

The term "interpolymer" is used herein to indicate a copolymer, or a terpolymer, or the like, where at least one other comonomer is polymerized with ethylene to make the interpolymer. Suitable unsaturated comonomers useful for polymerizing with ethylene include, for example, ethylenically unsaturated monomers, conjugated or non-conjugated dienes, polyenes, etc. Examples of such comonomers include $C_3$-$C_{20}$ α-olefins as propylene, isobutylene, 1-butene, 1-hexene, 4-methyl-1-pentene, 1-heptene, 1-octene, 1-nonene, 1-decene, 1,9-decadiene and the like. Other suitable monomers include styrene, halo- or alkyl-substituted styrenes, tetrafluoroethylene, vinylbenzocyclobutane, 1,4-hexadiene, 1,7-octadiene, and cycloalkenes, e.g., cyclopentene, cyclohexene and cyclooctene.

When used in reference to an ethylene homopolymer (i.e., a high density ethylene polymer not containing any comonomer and thus no short chain branches), the term "homogeneous ethylene polymer" or "homogeneous linear ethylene polymer" means the polymer was made using a homogeneous catalyst system such as, for example, that described Elston or Ewen or those described by Canich in U.S. Pat. Nos. 5,026,798 and 5,055,438, or by Stevens et al. in U.S. Pat. No. 5,064,802, the disclosures of all three of which are incorporated herein by reference.

The terms "substantially linear ethylene polymer" or "SLEP," are used interchangeably, and refer specifically to homogeneously branched ethylene polymers that have long chain branching. The term does not refer to heterogeneously or homogeneously branched ethylene polymers that have a linear polymer backbone. For substantially linear ethylene polymers, the long chain branches have the same comonomer distribution as the polymer backbone, and the long chain branches can be as long as about the same length as the length of the polymer backbone to which they are attached. The polymer backbone of substantially linear ethylene polymers is substituted with about 0.01 long chain branches/1000 carbons to about 3 long chain branches/1000 carbons, from about 0.01 long chain branches/1000 carbons to about 1 long chain branches/1000 carbons, and from about 0.05 long chain branches/1000 carbons to about 1 long chain branches/1000 carbons.

Long chain branching is defined herein as a chain length of at least 6 carbons, above which the length cannot be distinguished using $^{13}$C nuclear magnetic resonance spectroscopy. The presence of long chain branching can be determined in ethylene homopolymers by using $^{13}$C nuclear magnetic resonance (NMR) spectroscopy and is quantified using the method described by Randall (*Rev. Macromol. Chem. Phys.*, C29, V. 2&3, p. 285-297), the disclosure of which is incorporated herein by reference.

Substantially linear ethylene polymers are homogeneously branched ethylene polymers and are disclosed in U.S. Pat. Nos. 5,272,236 and 5,278,272, the disclosures of which are incorporated herein by reference. Homogeneously branched substantially linear ethylene polymers are available from The Dow Chemical Company as AFFINITY™ polyolefin plastomers and from Dupont Dow Elastomers JV as ENGAGE™ polyolefin elastomers. Homogeneously branched substantially linear ethylene polymers can be prepared via the solution, slurry, or gas phase polymerization of ethylene and one or more optional α-olefin comonomers in the presence of a constrained geometry catalyst, such as the method disclosed in European Patent Application 416,815-A, the disclosure of which is incorporated herein by reference. In some aspects, a solution polymerization process is used to manufacture the substantially linear ethylene polymer used in the present invention.

The term "heterogeneously branched ethylene polymer" refers to a polymer having a distribution of branching different from and broader that the homogeneous branching ethylene/α-olefin interpolymer at similar molecular weight. In further aspects, the "heterogeneous" and "heterogeneously branched" mean that the ethylene polymer is characterized as a mixture of interpolymer molecules having various ethylene to comonomer molar ratios. Alternatively, heterogeneously branched linear ethylene polymers can be defined as having a SCBDI less than about 50% and more typically less than about 30%. HBEPs and SLEPs also differ from the class of polymers known conventionally as heterogeneously branched traditional Ziegler polymerized linear ethylene interpolymers, for example, ultra-low density polyethylene ("ULDPE"), very low density polyethylene ("VLDPE"), linear low density polyethylene ("LLDPE") medium density polyethylene ("MDPE") or high density polyethylene ("HDPE") made, for example, using the technique disclosed by Anderson et al. in U.S. Pat. No. 4,076,698, in that substantially linear ethylene interpolymers are homogeneously branched interpolymers. Further, in accordance with the present invention, the polymer composition does not comprise more than 20% by weight of heterogeneously branched linear ethylene polymers, as measured by the total weight of the polymer composition.

Heterogeneously branched ethylene polymers are typically characterized as having molecular weight distributions, $M_w/M_n$, in the range of from about 3.5 to about 4.1 and, as such, are distinct from substantially linear ethylene polymers and homogeneously branched linear ethylene polymers in regards to both compositional short chain branching distribution and molecular weight distribution.

The substantially linear ethylene polymers useful in this invention have excellent processability, even though they have relatively narrow molecular weight distributions (MWDs). Furthermore, the melt flow ratio ($I_{10}/I_2$) of the substantially linear ethylene polymers can be varied essentially independently of the polydispersity index (i.e., molecular weight distribution ($M_w/M_n$)). This is contrasted with conventional heterogeneously branched linear polyethylene resins which have rheological properties such that as the polydispersity index increases, the $I_{10}/I_2$ value also increases. The rheological properties of substantially linear ethylene polymers also differ from homogeneously branched linear ethylene polymers which have relatively low, essentially fixed $I_{10}/I_2$ ratios.

HBEPs and SLEPs also differ significantly from the class known as free-radical initiated highly branched high pressure low density ethylene homopolymer and ethylene interpolymers such as, for example, ethylene-acrylic acid (EAA) copolymers and ethylene-vinyl acetate (EVA) copolymers, in that substantially linear ethylene polymers do not have equivalent degrees of long chain branching and are made using single site catalyst systems rather than free-radical peroxide catalyst systems. In accordance with the present invention, the polymer composition does not comprise more than 20% by weight of free-radical initiated highly branched high pressure low density ethylene homopolymer and ethylene interpolymers, as measured by the total weight of the polymer composition, exclusive of any adhesive polymer that contains such homopolymers and interpolymers (as discussed in more detail below).

In some aspects of the present invention, certain component parts of the disclosed carpets and carpet tiles are characterized as including woven materials or woven textile. It should be understood that in some aspects woven textiles have the appearance of two-sets of parallel threads or yarns interlaced at generally right angles to each other in the plane of the fabric. "Warp" yarns or threads lie along the length of the fabric and "weft" yarns lie in the transverse direction, i.e. across the width of the fabric. The type of yarns used to produce a woven textile can include, without limitation, monofilament, multifilament, a combination of monofilament and multifilament, spun yarns, tape or slit film yarns, or a combination of tape and spun yarns. In some aspects of the invention, the term "tape-spun" yarn refers to yarn having a slit film yarn in the warp direction and spun (relatively short staple length) yarn in the weft direction. In other aspects of the invention, the term "tape-tape" yarn refers to yarn having a slit film yarn both in the warp and the weft directions.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

A. Carpet Tiles

As summarized above, aspects of the invention described herein provide a carpet tile comprising a greige good, an adhesive layer, and a secondary backing material. In these aspects, the greige good can comprise a primary backing component, which can have a face surface and a back surface. The greige good can further comprise a plurality of fibers attached to the primary backing component and extending from the face surface of the primary backing component. In additional aspects, the adhesive layer can have a first surface and an opposed second surface. In these aspects, the adhesive layer can comprise an adhesive composition and a reinforcement material that is at least partially embedded within the adhesive composition. The first surface of the adhesive layer can be applied to the back surface of the primary backing component. Optionally, as further disclosed herein, the carpet tile can comprise a precoat layer positioned between the primary backing component and the adhesive layer. In further aspects, the secondary backing material can be adhered (coupled) to the primary backing component by contact with the second surface of the adhesive layer. In these aspects, it is contemplated that the reinforcement material can have opposed first and second sides that are spaced apart relative to a vertical axis. In exemplary aspects, the reinforcement material and the secondary backing material can be co-laminated onto the adhesive composition. In these aspects, the term "co-laminated" indicates that the reinforcement material and the secondary backing material are concurrently laminated onto the adhesive composition (in a single step). In further exemplary aspects, the reinforcement material can have an open structure that permits flow of the adhesive composition through the reinforcement material from the first side of the reinforcement material to the second side of the reinforcement material. This flow of the adhesive composition through the reinforcement material can embed at least a portion of the reinforcement material within the adhesive composition and define the adhesive layer. Optionally, in exemplary aspects, the entire reinforcement material or substantially the entire reinforcement material can be embedded within the adhesive composition such that the adhesive composition completely or substantially surrounds the reinforcement material. In these aspects, the presence of the adhesive composition on the second side of the reinforcement material can prevent or limit direct contact between the reinforcement material and the secondary backing material. However, in other aspects, it is contemplated that at least a first portion of the reinforcement material can be embedded within the adhesive composition (such that the adhesive composition prevents direct contact between the secondary backing material and the first portion of the reinforcement material), while at least a second portion of the reinforcement material is not fully embedded within the adhesive composition (such that the secondary backing material directly contacts portions of the second side of the second portion of the reinforcement material, which can optionally melt to the secondary backing material). Optionally, the open structure of the reinforcement material can comprise a porous structure having a plurality of pores that cooperate to provide fluid communication from the first side of the reinforcement material to the second side of the reinforcement material. Optionally, in other aspects, the open structure of the reinforcement material can comprise a plurality of through-openings that extend from the first side of the reinforcement material to the second side of the reinforcement material. For example, in exemplary aspects, it is contemplated that the open structure of the reinforcement material can comprise an open-mesh structure. In further exemplary aspects, it is contemplated that the reinforcement material can have a sufficient melt index to permit penetration of the adhesive composition while maintaining its structure.

As further described herein, it is contemplated that the disclosed carpet tiles can comprise a single extrusion layer. It is further contemplated that the disclosed carpet tiles can comprise a reinforcement material having an open structure that provides stability to the carpet tile even though only a single extrusion layer is applied. It is still further contemplated that the disclosed carpet tiles can be manufactured on nominal 12-foot broadloom tufting equipment and backed on conventional 12-foot backing lines with a 12-foot extruder. In further exemplary aspects, it is contemplated that the disclosed carpet tiles can be provided at a substantially lower weight than conventional carpet tiles, thereby reducing material costs and allowing for more competitive pricing.

As noted, the greige good comprises a primary backing component having a face surface and a back surface; and a plurality of fibers attached to the primary backing component and extending from the face surface of the primary backing component. To this end, the greige good and thus the resulting finished carpet or carpet product can be any carpet constructed with a primary backing component and includes tufted carpet and non-tufted carpet such as needle punched carpet. To form a tufted carpet, yarn is tufted through the primary backing component such that the longer length of each stitch extends through the face surface of the primary backing component and a portion of the yarn is exposed on the back surface of the primary backing.

The plurality of fibers can be present in yarn. In other aspects, the plurality of fibers can be present as separate fibers. In further aspects, the plurality of fibers form tufts, such as for example when tufted yarns are present. In still further aspects, a portion of the plurality of the fibers can exposed at the back surface of the primary backing component. In yet other aspects, a portion of the plurality of the fibers can be exposed at the back surface of the primary backing component in a form of back stitches.

The plurality of fibers can comprise a polyamide, a polyolefin, a polyester, or combinations thereof. The term "polyamide," as utilized herein, is defined to be any long-chain polymer in which the linking functional groups are amide (—CO—NH—) linkages. The term polyamide is further defined to include copolymers, terpolymers and the like as well as homopolymers and also includes blends of two or more polyamides. In some aspects, the plurality of polyamide fibers comprise one or more of nylon 6, nylon 66, nylon 10, nylon 612, nylon 12, nylon 11, or any combination thereof. In other aspects, the plurality of polyamide fibers comprise nylon 6 or nylon 66. In yet other aspect, the plurality of polyamide fibers are nylon 6. In a yet further aspect, the plurality of polyamide fibers are nylon 66.

In some aspects, the plurality of fibers comprise a polyester. The term "polyester fiber" as utilized herein, includes a manufactured fiber in which the fiber forming substance is any long-chain synthetic polymer composed of at least 85% by weight of an ester of a substituted aromatic carboxylic acid, including but not restricted to substituted terephthalic units, $p(\text{-R}-\text{O}-\text{CO}-\text{C}_6\text{H}_4-\text{CO}-\text{O}-)_x$ and parasubstituted hydroxy-benzoate units, $p(\text{-R}-\text{O}-\text{CO}-\text{C}_6\text{H}_4-\text{O}-)_x$. In some aspects, the plurality of the polyester fibers comprise polyethylene terephthalate (PET) homopolymers and copolymers, polybutylene terephthalate (PBT) homopolymers and copolymers, and the like, including those that contain comonomers such as cyclohexanedimethanol, cyclohexanedicarboxylic acid, and the like.

In still further aspects, the plurality of fibers can comprise polyolefin. As defined herein, the term "polyolefin" includes any class of polymers produced from a simple olefin (also called an alkene with the general formula $C_nH_{2n}$) as a monomer. In some aspects, the polyolefins which can be used to produce the yarn and fibers include, but are not limited to, polyethylene, polypropylene, both homopolymer and copolymers, poly(1-butene), poly(3-methyl-1-butene), poly(4-methyl-1-pentene) and the like, as well as combinations or mixtures of two or more of the foregoing. In certain aspects, the plurality of the polyolefin fibers comprise polyethylene or polypropylene. In other aspects, the plurality of the polyolefin fibers comprise polyethylene. In yet other aspects, the plurality of the polyolefin fibers comprise polypropylene.

In yet a further aspect, the plurality of fibers can comprise natural fibers, acrylics, viscose, rayon, cellulose acetate, linen, silk, cotton, wool, or any combination thereof.

As will be understood by one of ordinary skill in the art, the plurality of fibers can further comprise any type or form of fiber. For example, and without limitation, the plurality of fibers can comprise staple fibers or bulked continuous filament fibers.

As noted above and as understood by one of ordinary skill in the art, the greige good further comprises a primary backing component. In some aspects, the greige good comprises a single primary backing layer. Alternatively, the greige good can comprise a plurality of two or more primary backing layers. In those instances where the primary backing component comprises a plurality of primary backing layers, each of the plurality of layers can be superimposed upon the next such that a back surface of a first primary backing is adjacent to or contacting the top surface of a second primary backing, and so on. The resulting composite primary backing component has a face or top surface provided by the face or top surface of the first primary backing layer and a back or bottom face or surface provided by the back or bottom surface of the second or last in the superimposed series of primary backing layers. Still further, in those aspects where a plurality of primary backing layers are employed, the first and the second primary backings can comprise primary backing materials that are the same or that are different. In view of the foregoing, it should be appreciated that subsequent layers of the disclosed carpet constructions, such as for example the adhesive composition or optional precoat layers described below, are applied to the back surface of the primary backing component, irrespective of whether the primary backing component is comprised of a single primary backing layer or a plurality of primary backing layer.

The primary backing component can comprise a polyolefin, a polyester, a polyamide, or a combination thereof. The primary backing component can be a woven or non-woven primary backing. In certain aspects, the primary backing component can comprise non-woven webs, or spunbond materials. In some aspects, the primary backing component can comprise a combination of woven and non-woven materials. In some aspects, the primary backing component comprises a polyolefin polymer. In other aspects, the polyolefin polymer comprises polypropylene. In yet other aspects, the primary backing component is a slit film polypropylene sheet such as that sold by PROPEX or Synthetic Industries. In yet further aspects, the primary backing component can comprise polyester. In still further aspects, the primary backing component can comprise polyamide. In yet further aspects, the primary backing component can comprise a combination of polyamide and polyester. To this end, in certain aspects, the polyamide can be a nylon.

In certain aspects, the primary backing component can be a spunbond primary backing component. The spunbond primary backing can be produced by depositing extruded, spun filaments onto a collecting belt in a uniform random manner followed by bonding the fibers. The fibers are separated during the web laying process by air jets or electrostatic charges. The collecting surface is usually perforated to prevent the air stream from deflecting and carrying the fibers in an uncontrolled manner. Bonding imparts strength and integrity to the web by applying heated rolls or hot needles to partially melt the polymer and fuse the fibers together. Since molecular orientation increases the melting point, fibers that are not highly drawn can be used as thermal binding fibers. In some aspects, the spunbond primary backing component can comprise a bi-component filament of a sheath-core type. In some aspects, the polymeric core component can have a higher melting point than the polymeric sheath component. In some aspects, the polymeric core component can comprise polyester, aliphatic polyamides, polyphenylene oxide and/or co-polymers or blends thereof. In yet other aspects, the polyester can comprise polyethylene terephthalate, polybutylene terephthalate, or polyparaphenylene terephthalamide. In yet other aspects, the polymeric core comprises polyethylene terephthalate. In further aspects, the sheath polymer can comprise a polyamide, polyethylene, or polyester. In yet further aspects, the sheath polymer can comprise a nylon. In still further aspects, the sheath-core primary backing component comprises a polyester as a core component and nylon as a sheath component. An exemplary sheath-core primary backing component is commercially available from Low and Bonar.

Optionally, in exemplary aspects, the greige good can comprise a precoat layer disposed between the back surface of the primary backing component and the adhesive layer. In these aspects, the precoat layer can at least partially encapsulate the plurality of fibers of the greige good. In some aspects, the precoat layer can comprise latex. In other aspects, the precoat layer can comprise SBR latex. In further aspects, the precoat layer can comprise VAE latex. In still further aspects, the precoat layer can comprise EVA latex. Optionally, in other exemplary aspects, the precoat layer can comprise an acrylic material.

In various aspects, it is contemplated that the precoat layer can be provided at a coating weight ranging from about 10 to about 25 ounces/sq. yard. Optionally, the precoat layer can be provided at a coating weight ranging from about 12 to about 22 ounces/sq. yard. In further optional aspects, the precoat layer can be provided at a coating weight ranging from about 15 to about 20 ounces/sq. yard.

Optionally, if desired, the greige good can further comprise a precoat layer applied to the back surface of the primary backing prior to application of an adhesive composition. When applied, the precoat layer is disposed between the back surface of the primary backing component and the adhesive composition. Alternatively, if the precoat layer is not present, the adhesive composition can be disposed on the back surface of the primary backing component. The precoat layer can be used to lock the plurality of fibers or tufts in place. In some aspects, the precoat layer can provide additional strength to the tufts (so-called tuft bind strength). In yet other aspects, the precoat layer can be used to substantially prevent adhesive from the adhesive composition from penetrating through any openings that may exist between the plurality of fibers (the tufts) in the direction of the carpet top face.

In some aspects, the precoat layer comprises an aqueous precoat material. In some exemplary aspects, the aqueous precoat material can, for example, be added as a dispersion or as an emulsion. A precoat emulsion can be made from various polyolefin materials such as, for example and without limitation, ethylene acrylic acid (EAA), ethylene vinyl acetate (EVA), polypropylene or polyethylene (e.g., low density polyethylene (LDPE), linear low density polyethylene (LLDPE) or substantially linear ethylene polymer, or mixtures thereof). In some aspects, the precoat layer can comprise latex. It is further contemplated that the precoat material in the precoat layer can be selected from a group comprising, without limitation, an EVA hotmelt, a vinyl acetate ethylene (VAE) emulsion, carboxylated styrene-butadiene (XSB) latex copolymer, a styrene-butadiene resin (SBR) latex, a BDMMA latex, an acrylic latex, an acrylic copolymer, a styrene copolymer, butadiene acrylate copolymer, a polyolefin hotmelt, polyurethane, polyolefin dispersions and/or emulsions, and any combination thereof.

In certain aspects, the precoat layer can further comprise one or more flame retardant components. Exemplary flame retardants that can be incorporated into the precoat layer include, without limitation, organo-phosphorous flame retardants, red phosphorous magnesium hydroxide, magnesium dihydroxide, hexabromocyclododecane, bromine containing flame retardants, brominated aromatic flame retardants, melamine cyanurate, melamine polyphosphate, melamine borate, methylol and its derivatives, silicon dioxide, calcium carbonate, resourcinol bis-(diphenyl phosphate), brominated latex base, antimony trioxide, strontium borate, strontium phosphate, monomeric N-alkoxy hindered amine (NOR HAS), triazine and its derivatives, high aspect ratio talc, phosphated esters, organically modified nanoclays and nanotubes, non-organically modified nanoclays and nanotubes, ammonium polyphosphate, polyphosphoric acid, ammonium salt, triaryl phosphates, isopropylated triphenyl phosphate, phosphate esters, magnesium hydroxide, zinc borate, bentonite (alkaline activated nanoclay and nanotubes), organoclays, aluminum trihydrate (ATH), azodicarbonamide, diazenedicarboxamide, azodicarbonic acid diamide (ADC), triaryl phosphates, isopropylated triphenyl phosphate, triazine derivatives, alkaline activated organoclay and aluminum oxide. Any desired amount of flame retardant can be used in the precoat layer and the selection of such amount will depend on a required carpet application. Such amounts can be readily determined through no more than routine experimentation.

In still a further aspect, the precoat layer can further contain other ingredients. For example, a surfactant can be included. Suitable surfactants can include, for example and without limitation, nonionic, anionic, cationic and fluorosurfactants. In one aspect, the surfactant is present in an amount between about 0.01 and about 5 weight percent based on the total weight of the emulsion or dispersion. In another aspect, the surfactant is anionic. In a further aspect, the surfactant is cationic. In a yet further aspect, the surfactant is nonionic. In a still further aspect, the surfactant is a fluorosurfactant.

In another aspect, the precoat layer can further comprise a thickener, a defoaming agent, and/or a dispersion enhancer. In this aspect, the thickener helps to provide a suitable viscosity to the dispersion. For example, the thickener can exemplarily comprise sodium and ammonium salts of polyacrylic acids and best present in an amount between about 0.1 and about 5 weight percent based on the total weight of the dispersion. The defoaming agent can, without limitation, be a non-silicone defoaming agent and is present in an amount between about 0.01 and about 5.0 weight percent based on the total weight of the dispersion. An exemplified dispersion enhancer can be a fumed silica that acts as a compatibilizer for the dispersion. In some aspects, the fumed silica is present at between about 0.1 and about 0.2 weight percent based on the total weight of the dispersion.

In still another aspect, the precoat layer can comprise one or more fillers. Exemplary and non-limiting fillers that can be incorporated into the precoat layer can include calcium carbonate, fly-ash, recycled calcium carbonate, aluminum trihydrate, talc, nano-clay, barium sulfate, barite, barite glass fiber, glass powder, glass cullet, metal powder, alumina, hydrated alumina, clay, magnesium carbonate, calcium sulfate, silica, glass, fumed silica, carbon black, graphite, cement dust, feldspar, nepheline, magnesium oxide, zinc oxide, aluminum silicate, calcium silicate, titanium dioxide, titanates, glass microspheres, chalk, calcium oxide, and any combination thereof. In some aspects, the filler can comprise both calcium carbonate and alumina trihydrate. Calcium carbonate and alumina trihydrate can be present in any relative ratio suitable for a specific carpet application, for example and without limitation, calcium carbonate and alumina trihydrate can be present in a ratio of about 100:1 parts, about 100:2 parts, about 100:3 parts, about 100:4 parts, about 100:5 parts, about 100:6 parts, about 100:7 parts, about 100:8 parts, about 100:9 parts, or about 100:10 parts of calcium carbonate to alumina trihydrate.

The disclosed carpets and carpet products further comprise an adhesive layer comprised of an adhesive composition applied to the back surface of the primary backing component. As noted above, the back surface of the primary backing component in some aspects can have a precoat layer applied thereto such that the adhesive composition is applied subsequent to the application of the precoat layer. In other aspects where a precoat layer is not present, the adhesive composition can be applied directly to the back surface of the primary backing component.

In exemplary aspects, the adhesive composition can comprise a thermoplastic elastomer. Optionally, the thermoplastic elastomer can be a homogeneously branched ethylene polymer. Optionally, the thermoplastic elastomer can be a polyethylene elastomer. Optionally, the thermoplastic elastomer can be a polypropylene elastomer. Optionally, the thermoplastic elastomer can be an ethylene methyl acrylate (EMA) elastomer. In one exemplary aspect, the thermoplastic elastomer can be VISTAMAXX™ 6202, which is manufactured by ExxonMobil Chemical Company. In another exemplary aspect, the thermoplastic elastomer can be an AFFINITY™ polyolefin plastomer manufactured by the Dow Chemical Company. In a further exemplary aspect, the thermoplastic elastomer can be an ENGAGE™ polyolefin elastomers manufactured by Dupont Dow Elastomers JV.

The adhesive composition comprises a polymeric adhesive composition. In some aspects, the adhesive composition comprises substantially linear ethylene polymers and homogeneously branched linear ethylene polymers (i.e., homogeneously branched ethylene polymers). Homogeneously branched ethylene polymers (including substantially linear ethylene polymers in particular) have low solidification temperatures, good adhesion to polypropylene, and low modulus relative to conventional ethylene polymers such as low density polyethylene (LDPE), heterogeneously branched linear low density polyethylene (LLDPE), high density polyethylene (HDPE), and heterogeneously branched ultra-low density polyethylene (ULDPE). Optionally, the adhesive composition can comprise In certain aspects, when the adhesive composition is used for tufted carpets, the tuft bind strength and abrasion resistance of the carpet is increased by encapsulation of the yarn by the substantially linear ethylene polymers and homogeneously branched linear ethylene polymers. In some aspects, a tuft bind (or tuft lock) strength of 3 pounds (1.4 kg) or more, 3.25 pounds (1.5 kg) or more, 5 pounds (2.3 kg) or more, 6 pounds (2.7 kg) or more and 7.5 pounds (3.4 kg) or more is achieved. The tuft bind strength can be also be increased by increasing the molecular weight of the polymer. However, a higher polymer molecular weight selected for improved tuft bind strength is contra to the requirement of a lower polymer molecular weight which is generally needed for good extrusion coatability. Also, higher polymer densities are desirable for improved chemical and barrier resistance, yet higher densities invariably yield stiffer carpets. As such, polymer properties can be chosen such that a balance is maintained between extrusion coatability and abrasion resistance as well as between chemical resistance and carpet flexibility.

In some aspects, when properly selected substantially linear ethylene polymers or homogeneously branched linear ethylene polymers are used as the adhesive composition, the low flexural modulus of these polymers offers advantages in ease of carpet installation and general carpet handling. Substantially linear ethylene polymers, in particular, when employed as an adhesive composition show enhanced mechanical adhesion to polypropylene which improves the consolidation and delamination resistance of the various carpet layers and components, i.e., polypropylene fibers, fiber bundles, the primary backing component, the adhesive backing material and the secondary backing material when optionally applied. In some aspects, good abrasion resistance is especially important in commercial carpet cleaning operations as good abrasion resistance generally improves carpet durability.

In certain aspects, the adhesive composition comprising a substantially linear ethylene polymer or homogeneously branched linear ethylene polymer can provide a substantial fluid and particle barrier which enhances the hygienic properties of carpet.

In some further aspects, use of the adhesive composition comprising a substantially linear ethylene polymer or homogeneously branched linear ethylene polymer can allow totally recyclable carpet products particularly where the carpet comprises polypropylene fibers.

The adhesive composition can comprise a homogeneously branched ethylene polymer. The homogeneously branched ethylene polymer can have a single melting peak between −30° C. and 150° C., as determined using differential scanning calorimetry. In some aspects, the homogeneously branched ethylene polymer used in an adhesive composition in this invention, is a substantially linear ethylene polymer characterized as having (a) a melt flow ratio, $I_{10}/I_2 > 5.63$; (b) a molecular weight distribution, $M_w/M_n$, as determined by gel permeation chromatography and defined by the equation: $(M_w/M_n) < (I_{10}/I_2) - 4.63$; (c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the linear ethylene polymer has a homogeneously branched short chain branching distribution and no long chain branching, and wherein the substantially linear ethylene polymer and the linear ethylene polymer are simultaneously ethylene homopolymers or interpolymers of ethylene and at least one $C_3$-$C_{20}$ α-olefin and have the same $I_2$ and $M_w/M_n$ and wherein the respective critical shear rates of the substantially linear ethylene polymer and the linear ethylene polymer are measured at the same melt temperature using a gas extrusion rheometer; and (d) a single differential scanning calorimetry, DSC, melting peak between −30° and 150° C.

Determination of the critical shear rate in regards to melt fracture as well as other rheology properties such as "rheological processing index" (PI), is performed using a gas extrusion rheometer (GER). The gas extrusion rheometer is described by M. Shida, R. N. Shroff and L. V. Cancio in *Polymer Engineering Science*, Vol. 17, No. 11, p. 770 (1977), and in "Rheometers for Molten Plastics" by John Dealy, published by VanNostrand Reinhold Co. (1982) on pp. 97-99, the disclosures of both of which are incorporated herein by reference. GER experiments are performed at a temperature of 190° C., at nitrogen pressures between about 250 and about 5500 psig (about 1.7 and about 37.4 MPa) using a 0.0754 mm diameter, 20:1 L/D die with an entrance angle of about 180°. For the substantially linear ethylene polymers used herein, the PI is the apparent viscosity (in kpoise) of a material measured by GER at an apparent shear stress of $2.15 \times 10^6$ dyne/cm² ($2.19 \times 10^4$ kg/m²). In certain aspects, the adhesive composition comprises the substantially linear ethylene polymer having a PI in the range of 0.01 kpoise to 50 kpoise, 15 kpoise or less. The substantially linear ethylene polymers used herein also have a PI less than or equal to 70 percent of the PI of a linear ethylene polymer (either a Ziegler polymerized polymer or a homogeneously branched linear polymer as described by Elston in U.S. Pat. No. 3,645,992) having an $I_2$ and $M_w/M_n$, each within ten percent of the substantially linear ethylene polymer.

In some aspects, the homogeneously branched ethylene polymers used in the present invention can be characterized by a single DSC melting peak. The single melting peak is determined using a differential scanning calorimeter standardized with indium and deionized water. The method involves 5-7 mg sample sizes, a "first heat" to about 140° C. which is held for 4 minutes, a cool down at 10°/min to −30° C. which is held for 3 minutes, and heat up at 10° C./min to 150° C. for the "second heat". The single melting peak is taken from the "second heat" heat flow vs. temperature curve. Total heat of fusion of the polymer is calculated from the area under the curve.

In a further aspect, for polymers having a density of about 0.875 g/cc to about 0.910 g/cc, the single melting peak may show, depending on equipment sensitivity, a "shoulder" or a "hump" on the low melting side that constitutes less than about 12 percent, typically, less than about 9 percent, and more typically less than about 6 percent of the total heat of fusion of the polymer. Such an artifact is observable for other homogeneously branched polymers such as Exact™ resins and is discerned on the basis of the slope of the single melting peak varying monotonically through the melting region of the artifact. Such an artifact occurs within 34° C., typically within 27° C., and more typically within 20° C. of the melting point of the single melting peak. The heat of fusion attributable to an artifact can be separately determined by specific integration of its associated area under the heat flow vs. temperature curve.

In certain aspects, the molecular weight distribution ($M_w/M_n$) for the substantially linear ethylene polymers and homogeneous linear ethylene polymers used in the present invention is generally from about 1.8 to about 2.8. Substantially linear ethylene polymers are known to have excellent processability, despite having a relatively narrow molecular weight distribution. Unlike homogeneously and heterogeneously branched linear ethylene polymers, the melt flow ratio ($I_{10}/I_2$) of substantially linear ethylene polymers can be varied essentially independently of their molecular weight distribution, $M_w/M_n$.

In some aspects, the adhesive composition comprising homogeneously branched ethylene polymers includes interpolymers of ethylene and at least one α-olefin prepared by a solution, gas phase, or slurry polymerization process, or combinations thereof. In some aspects the α-olefins are represented by the following formula: $CH_2=CHR$ where R is a hydrocarbyl radical. Further, R may be a hydro-carbyl radical having from one to twenty carbon atoms and as such the formula includes $C_3$-$C_{20}$ α-olefins. In other aspects, α-olefins for use as comonomers include propylene, 1-butene, 1-isobutylene, 1-pentene, 1-hexene, 4-methyl-1-pentene, 1-heptene and 1-octene, as well as other comonomer types such as styrene, halo- or alkyl-substituted styrenes, tetrafluoro-ethylene, vinyl benzocyclobutene, 1,4-hexadiene, 1,7-octadiene, and cycloalkenes, e.g., cyclopentene, cyclo-hexene and cyclooctene. In certain aspects, the comonomer will be 1-butene, 1-pentene, 4-methyl-1-pentene, 1-hexene, 1-heptene, 1-octene, or mixtures thereof, as adhesive backing materials comprised of higher α-olefins will have especially improved toughness. In yet other aspects, the comonomer will be 1-octene and the ethylene polymer will be prepared in a solution process.

In certain aspects, the density of the substantially linear ethylene polymer or homogeneously branched linear ethylene polymer, as measured in accordance with ASTM D-792, does not exceed about 0.92 g/cc, and is generally in the range from about 0.85 g/cc to about 0.92 g/cc, from about 0.86 g/cc to about 0.91 g/cc, and from about 0.86 g/cc to about 0.90 g/cc.

In yet further aspects, the molecular weight of the homogeneously branched linear ethylene polymer or substantially linear ethylene polymer can be characterized using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the homogeneously branched linear ethylene polymer or substantially linear ethylene polymer is generally from about 1 grams/10 minutes (g/10 min) to about 500 g/10 min, about 2 g/10 min to about 300 g/10 min, from about 5 g/10 min to about 100 g/10 min, from about 10 g/10 min to about 50 g/10 min, and about 25 to about 35 g/10 min.

In some other aspects, an additional measurement can be useful in characterizing the molecular weight of the homogeneous linear ethylene polymer or the substantially linear ethylene polymer and can be performed using a melt index measurement according to ASTM D-1238, Condition 190° C./10 kg (formerly known as "Condition (N)" and also known as $I_{10}$). The ratio of the $I_{10}$ and the $I_2$ melt index terms is the melt flow ratio and is designated as $I_{10}/I_2$. For the substantially linear ethylene polymer, the $I_{10}/I_2$ ratio indicates the degree of long chain branching, i.e., the higher the $I_{10}/I_2$ ratio, the more long chain branching in the polymer. The $I_{10}/I_2$ ratio of the substantially linear ethylene polymer is at least about 6.5, at least about 7, or at least about 8. The $I_{10}/I_2$ ratio of the homogeneously branched linear ethylene polymer is generally less than about 6.3.

In some aspects, the ethylene polymers can have a relatively low modulus. That is, the ethylene polymer is characterized as having a 2% secant modulus less than about 24,000 psi (163.3 MPa), less than about 19,000 psi (129.3 MPa), and less than about 14,000 psi (95.2 MPa), as measured in accordance with ASTM D790.

In certain aspects, the ethylene polymers described herein are substantially amorphous or totally amorphous. That is, the ethylene polymer is characterized as having a percent crystallinity less than about 40 percent, less than about 30 percent, more less than about 20, and less than about 10 percent, as measured by differential scanning calorimetry using the equation:

percent crystallinity %=$(H_f/292) \times 100$, where $H_f$ is the heat of fusion in Joules/gram.

In other aspects, the homogeneously branched ethylene polymer (HBEP) can be used alone or can be blended or mixed with one or more synthetic or natural polymeric material. In some aspects, the polymers for blending or mixing with homogeneously branched ethylene polymers used in the present invention include, but are not limited to, another homogeneously branched ethylene polymer, low density polyethylene, heterogeneously branched LLDPE, heterogeneously branched ULDPE, medium density polyethylene, high density polyethylene, grafted polyethylene (e.g. a maleic anhydride extrusion grafted heterogeneously branched linear low polyethylene or a maleic anhydride extrusion grafted homogeneously branched ultra-low density polyethylene), ethylene acrylic acid copolymer, ethylene vinyl acetate copolymer, ethylene ethyl acrylate copolymer, polystyrene, polypropylene, polyester, polyurethane, polybutylene, polyamide, polycarbonate, rubbers, ethylene propylene polymers, ethylene styrene polymers, styrene block copolymers, and vulcanates.

In further aspects, the adhesive composition can comprise a blend of at least two polyethylenes, wherein the polyethylene can comprise a homogeneously branched ethylene polymer (HBEP) or a substantially linear ethylene polymer (SLEP), or mixtures thereof. In other aspects, the adhesive composition can comprise a blend of at least three or four, or more polyethylenes, wherein the polyethylenes comprise a homogeneously branched ethylene polymer (HBEP) or a substantially linear ethylene polymer (SLEP), or mixtures thereof. Still further, adhesive composition can comprise a polyethylene comprising at least about 80% by weight of at least one (or two or more) HBEP or SLEP as measured by weight of the polyethylene, including exemplary values of about 85, 90, 95, 97, 98, or about 99% by weight of the polyethylene, where any value can comprise an upper or a lower endpoint, as appropriate.

In aspects where a blend of at least two (or three or more) polyethylenes is used, the amount of each polyethylene present in the blend can be individually varied in the amounts of, for example, from at least about 0.1, 1, 5, 10, 15, 20, 25, 30, 35, 40, 45, 50, 55, 60, 65, 70, 75, 80, 85, 90, 95, 97 or about 98% by weight of the total blend, where any value can be used for the individual components and the combined relative amount of polyethylenes totals 100% by weight. Similarly the amount of each polyethylene present in the blend can be individually varied in the amounts of, for example, up to an upper limit amount of to about 0.1, 1, 5, 10, 15, 20, 25, 30, 35, 40, 45, 50, 55, 60, 65, 70, 75, 80, 85, 90, 95, 97 or about 98% by weight of the total blend. Still further, each individual polyethylene can be present in any range of amounts derived from the above lower and upper limit amounts.

The density of the polyethylene components in the blend can be from about 0.860, 0.870, 0.880, 0.885, 0.890, 0.895, 0.900, 0.905, or about 0.910 g/cc, where any value can comprise an upper or a lower endpoint, as appropriate.

The actual blending or mixing of various polymers may be conveniently accomplished by any technique known in the art including, but not limited to, melt extrusion compounding, dry blending, roll milling, melt mixing such as in a Banbury mixer and multiple reactor polymerization. In some aspects, the blends or mixtures include a homogeneously branched ethylene polymer and a heterogeneously branched ethylene α-olefin interpolymer, wherein the α-olefin is a $C_3$-$C_8$ α-olefin prepared using two reactors operated in parallel or in series with different catalyst systems employed in each reactor. Multiple reactor polymerizations are described, for example, in U.S. Pat. No. 5,677,383, the disclosure of which is incorporated herein by reference. In some aspects, multiple reactor polymerizations comprise non-adiabatic solution loop reactors as described, for example, in international Patent Cooperation Treaty (PCT) application number PCT/US97/05420 and U.S. Pat. No. 5,977,251, the disclosures of both of which are incorporated herein by reference.

In another aspect, the adhesive composition can comprise a modified homogeneously branched ethylene polymer. In particular, in certain aspects of the invention the at least one homogeneously branched ethylene polymer that can be present within the adhesive composition can be modified by the addition of at least one adhesive polymeric additive. Suitable adhesive polymeric additives include, for example and without limitation, polymer products comprised of (1) one or more ethylenically unsaturated carboxylic acids, anhydrides, alkyl esters and half esters, e.g., acrylic acid, methacrylic acid, maleic acid, maleic anhydride, itaconic acid, fumaric acid, crotonic acid and citraconic acid, citraconic anhydride, succinnic acid, succinnic anhydride, methyl hydrogen maleate, and ethyl hydrogen maleate; esters of ethylenically unsaturated carboxylic acids, e.g., ethyl acrylate, methyl methacrylate, ethyl methacrylate, methyl acrylate, isobutyl acrylate, and methyl fumarate; unsaturated esters of carboxylic acids, e.g., vinyl acetate, vinyl propionate, and vinyl benzoate; and ethylenically unsaturated amides and nitriles e.g., acrylamide, acrylonitrile, methacrylonitrile and fumaronitrile; and (2) one or more ethylenically unsaturated hydrocarbon monomers such as aliphatic α-olefin monomers, e.g., ethylene, propylene, butene-1 and isobutene; conjugated dienes, e.g., butadiene and isoprene; and monovinylidene aromatic carbocyclic monomers, e.g., styrene, α-methylstyrene, toluene, and t-butylstyrene.

A modified homogeneously branched ethylene polymer for use in the adhesive composition can be conveniently prepared by known techniques such as, for example, by interpolymerization or by a polymerization procedure followed by a chemical or extrusion grafting procedure. Suitable grafting techniques are described in U.S. Pat. Nos. 4,762,890; 4,927,888; 4,230,830; 3,873,643; and 3,882,194, the disclosures of all of which are incorporated herein by reference.

In some aspects, the adhesive polymeric additives for use in the present invention can include maleic anhydride grafts wherein maleic anhydride is grafted onto an ethylene polymer at a concentration of about 0.1 to about 5.0 weight percent, about 0.5 to about 1.5 weight percent. The presence of ethylene polymer/maleic anhydride grafts as adhesive polymeric additives in the present invention can improve the performance and operating window of extrusion coated homogeneously branched ethylene polymers as the adhesive composition, especially when used in connection with polar polymers such as for example, but is not limited to, nylon and polyester faced carpets. The improvement pertained to substantially higher comparative abrasion resistance and tuft bind strength. In an exemplary aspect, a composition for forming a maleic anhydride graft is the Amplify® GR 204 available from Dow Chemicals.

In further aspects, the ethylene polymers for use as the grafted host polymer include low density polyethylene (LDPE), high density polyethylene (HDPE), heterogeneously branched linear low density polyethylene (LLDPE), homogeneously branched linear ethylene polymers and substantially linear ethylene polymers. In some aspects, the host ethylene polymers have a polymer density greater than or equal to about 0.86 g/cc, 0.87 g/cc, 0.88 g/cc, 0.89 g/cc, 0.90 g/cc, 0.91 g/cc, 0.92 g/cc, 0.93 g/cc, or greater than or equal to about 0.94 g/cc. In yet other aspects, the substantially linear ethylene polymers and high density polyethylene are utilized as host ethylene polymers.

In some aspects, it is contemplated that the adhesive composition can be applied as an extruded layer or it can applied by any other technique known in the art onto the back surface of the primary backing component. Still further, it should be understood that the polymeric adhesive composition can be used neat, or can have one or more additives included. In this aspect, the adhesive composition of this invention may optionally include exemplary additives such as foaming agents, pH controllers, flame retardants, fillers, tackifiers, wetting agents, dispersing agents, anti-microbial agents, lubricants, dyes, anti-oxidants, and the like, which are well known to those skilled in the art, without loss of the characteristic properties.

In one aspect, the adhesive composition can further comprise one or more flame retardants. Optionally, when the adhesive composition is designed for commercial applications, the one or more flame retardants can be sufficient to ensure the carpet tile structure satisfies the requirements of the radiant flux floor covering test according to the ASTM-E648 testing procedures. In particular, according to certain aspects, the disclosed carpet tiles can exhibit a Class 1 critical radiant flux of greater than 0.45 watts per $cm^2$ as measured according to ASTM-E648. According to other aspects of the invention, the disclosed carpet tiles can exhibit a Class 2 critical radiant flux in the range of from 0.22 to 0.44 watts per $cm^2$ as measured according to ASTM-E648. In still further aspects, the disclosed carpet tiles can exhibit an unclassifiable critical radiant flux of less than 0.22 watts per $cm^2$ as measured according to ASTM-E648.

Exemplary flame retardants that can be incorporated into the adhesive compositions of the present invention include, without limitation, organo-phosphorous flame retardants, red phosphorous magnesium hydroxide, magnesium dihydroxide, hexabromocyclododecane, bromine containing flame retardants, brominated aromatic flame retardants, melamine cyanurate, melamine polyphosphate, melamine borate, methylol and its derivatives, silicon dioxide, calcium carbonate, resourcinol bis-(diphenyl phosphate), brominated latex base, antimony trioxide, strontium borate, strontium phosphate, monomeric N-alkoxy hindered amine (NOR HAS), triazine and its derivatives, high aspect ratio talc, phosphated esters, organically modified nanoclays and nanotubes, non-organically modified nanoclays and nanotubes, ammonium polyphosphate, polyphosphoric acid, ammonium salt, triaryl phosphates, isopropylated triphenyl phosphate, phosphate esters, magnesium hydroxide, zinc borate, bentonite (alkaline activated nanoclay and nanotubes), organoclays, aluminum trihydrate (ATH), azodicarbonamide, diazenedicarboxamide, azodicarbonic acid diamide (ADC), triaryl phosphates, isopropylated triphenyl phosphate, triazine derivatives, alkaline activated organoclay and aluminum oxide. Any desired amount of flame retardant can be used in the adhesive compositions of the instant invention and the selection of such amount will depend, in part, upon the particular flame retardant used and desired carpet applications. Such amounts can be readily determined through no more than routine experimentation.

Exemplary and non-limiting fillers that can be incorporated into the adhesive composition of the present invention can include calcium carbonate, fly-ash, recycled calcium carbonate, aluminum trihydrate, talc, nano-clay, barium sulfate, barite, barite glass fiber, glass powder, glass cullet, metal powder, alumina, hydrated alumina, clay, magnesium carbonate, calcium sulfate, silica, glass, fumed silica, carbon black, graphite, cement dust, feldspar, nepheline, magnesium oxide, zinc oxide, aluminum silicate, calcium silicate, titanium dioxide, titanates, glass microspheres, chalk, calcium oxide, and any combination thereof. In one aspect, the adhesive composition comprises inorganic filler with high heat content. In some aspects, it is for the filler to exhibit relatively high heat content. Examples of such fillers include, but are not limited to, calcium carbonate, aluminum trihydrate, talc, and barite. The exemplified high heat content fillers allow the extrudate to remain at elevated temperatures longer with the beneficial result of providing enhanced encapsulation and penetration. In this aspect, the high heat content fillers should be ground or precipitated to a size that can be conveniently incorporated in an extrusion coating melt stream. Exemplary non-limiting particle sizes for the inorganic filler material can include particle sizes in the range of from about 1 to about 50 microns. Still further, it should also be understood that the filler component can be present in any desired amount. However, in an exemplary aspect, the filler is present in an amount in the range of from about 0 weight % to about 80 weight %, based upon the total weight of the adhesive composition, including exemplary amounts of 5 weight %, 10 weight %, 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, and about 80 weight %. Still further, the amount of filler present can be in any range derived from any two of the above stated weight percentages.

In still another aspect, the adhesive composition can further comprise one or more tackifying additives. The tackifier can for example be tall oil or rosin based or, alternatively, can be an aliphatic or aliphatic aromatic hydrocarbon blend resin. As the tackifier is an optional component, the amount of tackifier can be, when present, in the range of from greater than 0 weight percent up to and even exceeding about 50 weight % of the adhesive composition. For example, in one aspect, the amount of tackifier can be in the range of from about 5 weight % to about 45 weight %. In still another aspect, the amount of tackifier can be in the range of from about 10 weight % to about 20 weight %.

In some aspects, the adhesive compositions of the current invention can comprise latex adhesive materials. In yet other aspects, the adhesive composition can comprise non-latex adhesive materials. In such aspects, the adhesive materials can include polyurethanes, hot melt adhesives of various compositions, polyvinylchloride and meltable powders.

In certain aspects, the adhesive composition is present in an amount of about 8 ounces/sq. yard or more, including exemplary values of about 9 ounces/sq. yard, about 10 ounces/sq. yard, about 11 ounces/sq. yard, about 12 ounces/sq. yard, about 13 ounces/sq. yard, about 14 ounces/sq. yard, about 15 ounces/sq. yard, about 16 ounces/sq. yard, about 17 ounces/sq. yard, about 18 ounces/sq. yard, about 19 ounces/sq. yard, about 20 ounces/sq. yard, about 21 ounces/sq. yard, about 22 ounces/sq. yard, about 23 ounces/sq. yard, about 24 ounces/sq. yard, about 25 ounces/sq. yard, about 26 ounces/sq. yard, about 27 ounces/sq. yard, about 28 ounces/sq. yard, about 29 ounces/sq. yard, and about 30 ounces/sq. yard. In other aspects, the adhesive composition can be present in an amount in any range derived from any two of the above stated values. For example, and without limitation, the adhesive composition can be present in an amount from about 8 ounces/sq. yard to about 30 ounces/sq. yard, or in amount from about 10 ounces/sq. yard to about 25 ounces/sq. yard, or from about 15 ounces/sq. yard to about 22 ounces/sq. yard, or from about 18 ounces/sq. yard to about 20 ounces/sq. yard.

In yet further aspects, the disclosed adhesive composition when applied to the carpet forms an adhesive layer. In certain aspects, the carpet tiles disclosed herein comprise one adhesive layer. In other aspects, the carpet can comprise two or more adhesive layers. The final number of the adhesive layers can be determined by one of ordinary skill in the art depending on the desired application.

The layer of reinforcement material has been found to enhance the dimensional stability of the carpet tiles disclosed herein. Suitable reinforcing materials include dimensionally and thermally stable fabrics such as non-woven or wet-laid fiberglass material (e.g., non-woven or wet-laid fiberglass scrims), as well as woven and non-woven thermoplastic fabrics (e.g. polypropylene, nylon and polyester). Optionally, in one exemplary aspect, the reinforcement material can comprise a highly porous fiberglass mat with an acrylic binder in a weight range from 0.7 to 2.5 ounces per square yard. In another optional aspect, it is contemplated that the reinforcement material can comprise a wet-laid fiberglass scrim with a SBR latex, PVOH, PVC latex, or PVC plastisol binder in a weight range of 0.5 to 2.5 ounces per square yard.

Following application of the adhesive composition, a secondary backing layer can be applied. The secondary backing has a first surface and a second surface, wherein the first surface of the secondary backing is adhered to the back surface of the primary backing component by the adhesive composition.

In exemplary aspects, the secondary backing material can comprise a non-woven material. Optionally, the non-woven secondary backing material can comprise a fleece material, such as for example and without limitation, a fleeced secondary backing material, whereby a polymeric non-woven textile is needle-punched with staple fibers to provide a fleeced polymeric non-woven backing material.

Optionally, the secondary backing material can comprise polypropylene, polyethylene terephthalate (PET), polyethylene, or combinations thereof. For example, when a polypropylene fleece is used as a secondary backing, it is contemplated that the secondary backing can be provided in an amount from 3 ounces/sq. yard to about 5 ounces/sq. yard or, in an amount of about 4 ounces/sq. yard. As another example, the secondary backing can comprise a PET or polypropylene needlebond pad, or combinations thereof, which can comprise virgin material, post-consumer material, post-industrial material, or combinations thereof, and which can optionally be provided in an amount ranging from about 4 ounces/sq. yard to about 30 ounces/sq. yard or from about 12 ounces/sq. yard to about 15 ounces/sq. yard.

Optionally, the secondary backing material can comprise a spunbond material. Optionally, in some aspects, the secondary backing material can be needle-punched. In these aspects, the secondary backing material can be heat-stabilized. Optionally, the secondary backing material can comprise a pointbond material.

Optionally, in further exemplary aspects, the secondary backing material can comprise a woven material.

In one aspect, the secondary backing can comprise a tape-tape yarn type backing, or a tape-spun yarn type backing. In certain aspects, the secondary backing is a tape-tape yarn woven material. In some aspects, the secondary backing comprises a polyolefin. In a yet further aspect, the polyolefin can comprise polypropylene. In certain exemplary aspects, the material for the secondary backing material can be a conventional material, for example and without limitation, a woven polypropylene fabric sold by Propex. Such exemplary secondary backings can also comprise a material that is a leno weave with polypropylene tape running in one direction and polypropylene spun yarn running in the other. In still other aspects, the secondary backing material used with the present invention is a woven polypropylene fabric with monofilaments running in both directions. A suitable example of such a material is manufactured by Shaw Industries, Inc. under the designation Style S8880.

In further aspects, the secondary backing material can be a material known as a fiber lock weave or "FLW." FLW is a fabric which includes fibers needle punched into it. It is contemplated that an FLW type fabric can also be used as a primary backing component, for example, in a carpet with a relatively low pile height or weight.

In some aspects, the secondary backing can be a woven needle punched polypropylene fabric such as SoftBac® manufactured by Shaw Industries, Inc. In this exemplary aspect, this material has been enhanced by having about 1.5 ounce/sq. yard of polypropylene fibers or polyethylene terephthalate fibers needle punched onto one side of it and has a total basis weight of about 3.5 ounce/sq. yard. This needle punched fabric can be laminated so as to have the polypropylene fibers embedded within the adhesive backing layer. In still further aspects other materials can be used for the secondary backing, for example, and without limitation, if an integral pad is desired, a polyurethane foam or polyolefin cushion or other cushion material can be laminated to the back side of the carpet. Such backings can be used for broadloom carpet or carpet tiles.

In one particular non-limiting example, it is contemplated that the carpet tile can comprise: an adhesive composition comprising a highly-filled polyethylene compound; a reinforcement layer comprising a wet-laid fiberglass material; and a secondary backing material comprising a non-woven polypropylene or PET fleece material.

In another specific non-limiting example, the carpet tile can comprise: an SBR precoat that is provided at a coating weight ranging from about 15 to about 20 ounces/sq. yard; and an adhesive composition comprising a thermoplastic elastomer that is provided at a coating weight of about 18 to about 20 ounces/sq. yard and that is at least 70% filled.

FIG. 1 schematically shows an exemplary aspect of the carpet tile disclosed herein. Specifically, FIG. 1 demonstrates an exemplary carpet tile 100 disclosed herein. A plurality of fibers 102 are attached to or tufted into a primary backing component 104 and extending from a face surface of the primary backing component. A portion of the plurality of fibers is exposed at a back surface of the primary backing component in the form of back stitches 106. An optional precoat layer 108 is applied to the back surface of the primary backing component and the back stiches. An adhesive composition 110 is further applied to the carpet tile. As further disclosed herein, the reinforcement material 111 and the secondary backing 112 are co-laminated to the primary backing component, with a portion of the adhesive composition passing through the reinforcement material 111 to permit contact between the adhesive composition 110 and the secondary backing 112.

In some aspects, the carpets and carpet structures used to make the disclosed carpet tiles can be provided as broadloom carpet. In yet further aspects, the carpets and carpet structures used to make the disclosed carpet tiles can be provided as a turf. Still further, it should be understood that, for example, in those aspects in which the carpet is provided as turf, the carpet can further comprise one or more additional components selected to achieve desirable properties. For example and without limitation, in some aspects such carpets can comprise additional energy management materials such as energy reflecting and adsorbing materials, thermal insulation materials, and the like.

In exemplary aspects, it is contemplated that the disclosed carpet tiles can be suitable for use in residential applications. In further exemplary aspects, it is contemplated that the disclosed carpet tiles can be suitable for use in commercial applications. More generally, it is contemplated that the disclosed carpet tiles can be suitable for use in any environment where carpet tiles are conventionally used or could be useful.

B. Methods of Making Carpet Tiles

Also described are methods of making the disclosed carpet tiles. In exemplary aspects, the method of making a carpet tile can comprise extruding the adhesive composition onto the back surface of the primary backing component of the greige good. In further aspects, the method can comprise co-laminating the reinforcement material and the secondary backing material onto the adhesive composition. In these aspects, and as further disclosed herein, the term "co-laminating" indicates that the reinforcement material and the secondary backing material are concurrently laminated onto the adhesive composition (in a single step). As further disclosed herein, the reinforcement material can have an open structure and opposed first and second sides that are spaced apart relative to a vertical axis. In additional aspects, the method can comprise allowing the adhesive composition to flow through the reinforcement material from the first side of the reinforcement material to the second side of the reinforcement material such that the adhesive composition on the second side of the reinforcement material contacts the secondary backing material. In further aspects, the method can comprise cooling the adhesive composition to define an adhesive layer in which the reinforcement material is at least partially embedded within the adhesive composition. As further disclosed herein, following co-lamination of the reinforcement material and the secondary backing material, the secondary backing material can be adhered to the primary backing component by contact with the adhesive composition of the adhesive layer. Optionally, the method can further comprise, prior to extrusion of the adhesive composition on the primary backing component, applying a precoat layer as disclosed herein to the back surface of the primary backing component to at least partially encapsulate the fibers that extend through the primary backing component. Following cooling of the adhesive composition, the method can further comprise cutting the greige good, the adhesive layer, and the secondary backing material to form the carpet tile.

In exemplary aspects, the greige good can be provided at a first width greater than a width of the carpet tile. In these aspects, the method can further comprise, following cooling of the adhesive composition, cutting the greige good, the adhesive layer, and the secondary backing material to a second width that is less than the first width. In additional aspects, the method can further comprise positioning a portion of the greige good, the adhesive layer, and the secondary backing material having the second width within a cutting machine configured to receive material having the second width. In further aspects, the method can further comprise operating the cutting machine to form the carpet tile from the portion of the greige good, the adhesive layer, and the secondary backing material within the cutting machine. In exemplary aspects, the first width can be about 12 feet, and the second width can be about 6 feet.

Optionally, in exemplary aspects, the adhesive composition can be the only portion of the carpet tile that is extruded, and the method does not comprise any additional extrusion steps.

The face of a tufted carpet, which can be used to produce the carpet tiles disclosed herein, can generally be made in three ways. First, for loop pile carpet, the yarn loops formed in the tufting process are left intact. Second, for cut pile carpet, the yarn loops are cut, either during tufting or after, to produce a pile of single yarn ends instead of loops. Third, some carpet styles include both loop and cut pile. One variety of this hybrid is referred to as tip-sheared carpet where loops of differing lengths are tufted followed by shearing the carpet at a height so as to produce a mix of uncut, partially cut, and completely cut loops. Alternatively, the tufting machine can be configured so as to cut only some of the loops, thereby leaving a pattern of cut and uncut loops. Whether loop, cut, or a hybrid, the yarn on the back surface of the primary backing component comprises tight, unextended loops. The combination of tufted yarn and a primary backing component without the application of an adhesive backing material or secondary backing material is referred to in the carpet industry as raw tufted carpet or greige goods. Greige goods become finished tufted carpet with the application of an adhesive backing material and secondary backing material if present to the back surface of the primary backing component. In the aspects of the current invention, the greige goods become finished tufted carpet with the application of an adhesive backing material, the reinforcement material, and the secondary backing material. Finished tufted carpet can be prepared as broadloom carpet in rolls typically 6 or 12 feet wide. Such rolls of broadloom carpet can then be provided to conventional cutting equipment for downstream cutting into carpet tiles. Optionally, when the broadloom carpet is provided on rolls that are 12 feet wide, it is contemplated that the carpet can be cut down the middle to divide the carpet into two nominally six-foot wide carpet structures that are sized for delivery to a nominally 6-foot wide cutting machine. Thus, whereas conventionally carpet tiles have been produced using 6-foot wide rolls, it is contemplated that the carpet tiles disclosed herein can be produced on the same nominally 12-foot wide broadloom machines that are used to produce 12-foot wide broadloom carpets. It is further contemplated that such broadloom machines can be modified to include an extruder and a corresponding 12-foot die to permit application of an adhesive composition as disclosed herein.

Any conventional tufting or needle-punching apparatus and/or stitch patterns can be used to make the carpets that are used to produce the carpet tiles of the present invention. Likewise, it does not matter whether tufted yarn loops are left uncut to produce a loop pile; cut to make cut pile; or cut, partially cut and uncut to make a face texture known as tip sheared. After the yarn is tufted or needle-punched into the primary backing component, the greige good can be conventionally rolled up with the back surface of the primary backing component facing outward and held until it is transferred to the backing line.

In one exemplary aspect, the greige good can be scoured or washed before it has an adhesive composition applied thereon to remove or displace all or substantially all of the processing materials, such as for example oily or waxy chemicals, known as spin-finish chemicals, that remain on the yarn from the yarn manufacturing processes. It is also contemplated that the use of polyolefin waxes (rather than conventional organic and mineral oils) as processing materials would allow improved adhesive composition performance in itself or at least minimize the use of scouring or washing methodologies.

Optionally, the disclosed adhesive composition can be applied to the back surface of the primary backing component to affix the yarn to the primary backing component. In one aspect, the adhesive backing substantially encapsulates a portion of the back stitching of the yarn, penetrates the yarn, and binds individual carpet fibers. Properly applied adhesive compositions do not substantially pass through the primary backing component.

In some aspects the greige good further comprises a precoat layer disposed between the back surface of the primary backing component and the adhesive composition. The precoat can be applied to the carpet in various ways. For example, the dispersion can be applied directly, such as with a roll over roller applicator, or a doctor blade. Alternatively, the precoat can be applied indirectly, such as with a pan applicator. It is contemplated that the amount of precoat applied and the concentration of the particles in the precoat can be varied depending on the desired processing and product parameters. In one exemplary aspect, the amount of dispersion applied and the concentration of the particles are selected so as to apply between about 4 and about 12 ounces per square yard (OSY) of carpet. Accordingly, it should be understood that desired application weight of the precoat will depend, at least in part, upon the presence and amount of inorganic fillers and/or flame retardants in the precoat. In an exemplary aspect, a latex precoat is the NX4628 from BASF.

In further aspects, after application of the precoat, heat can be applied to the back surface of the primary backing component so as to dry, melt, and/or cure the emulsion. As a result, the loops of yarn can be at least partially fixed to the primary backing component. In some aspects, the heat is applied by passing the product through an oven.

After treatment with the optional precoat layer additional layers of materials can be applied thereto. The additional layers can be applied by various methods including but not limited to involving the use of an extruded sheet of an adhesive composition as described above, onto which a secondary backing can also be laminated. In some aspects, a molten adhesive composition is extruded through a die so as to make a sheet which is as wide as the carpet. The molten, extruded sheet is applied to the back surface of the primary carpet backing or a precoat layer if present. Since the sheet is molten, the sheet will conform to the shape of the loops of yarn and further serve to encapsulate and fix the loops in the primary backing component. In aspects where a precoat has been applied to the back surface of the primary backing component, it will be understood that the precoat is disposed between the adhesive backing composition and the back surface of the primary backing component. Alternatively, according to aspects where the optional precoat layer is not applied, the adhesive composition of the present invention is applied directly on the back surface of the primary backing component and can, itself, serve to fix the loops in the primary backing component.

In aspects where extrusion techniques are used, exemplary extrusion coating configurations can include, without limitation, a monolayer T-type die, single-lip die coextrusion coating, dual-lip die coextrusion coating, a coat hanger die, and multiple stage extrusion coating. In some aspects, the extrusion coating equipment is configured to apply a total coating weight of from about 1 to about 60 ounces/yd$^2$ (OSY), including exemplary amounts of about 2, 3, 4, 5, 7, 8, 9, 10, 15, 20, 25, 30, 35, 40, 45, 50 and about 55 ounces/yd$^2$ (OSY), and any range of coating weights derived from these values. To that end, it should be understood that the desired coating weight of the extrusion coated layers will depend, at least in part, upon the amount of any flame retardants or mineral fillers in the extrudate.

The extrusion coating melt temperature principally depends on the particular composition of the adhesive composition being extruded. When using the adhesive composition described above, comprising the disclosed substantially linear polyethylene, the extrusion coating melt temperature can be greater than about 3500° F. and, in some aspects, in the range of from 3500° F. to 6500° F. In another aspect, the melt temperature can be in the range of from 3750° F. to 6000° F. Alternatively, the melt temperature can be in the range of from 4000° F. to 5500° F. Still further, in aspects of the invention the melt temperature can be in the range of from 4250° F. to 5000° F.

As described herein, the disclosed carpet tiles can further comprise a secondary backing having a first surface and a second surface, wherein the first surface of the secondary backing is facing the back surface of the primary backing component. In some aspects, the secondary backing can be provided simultaneously with the reinforcement material and then co-laminated to the primary backing component. In other aspects, the secondary backing can be separately disposed on the reinforcement material and the adhesive composition prior to laminating the reinforcement material the greige good with the adhesive material. In exemplary aspects, the secondary backing can be co-laminated in such way that the first surface of the secondary backing is adhered to the back surface of the primary backing component by the portion of the adhesive composition that passes through the reinforcement material.

Figure 2:
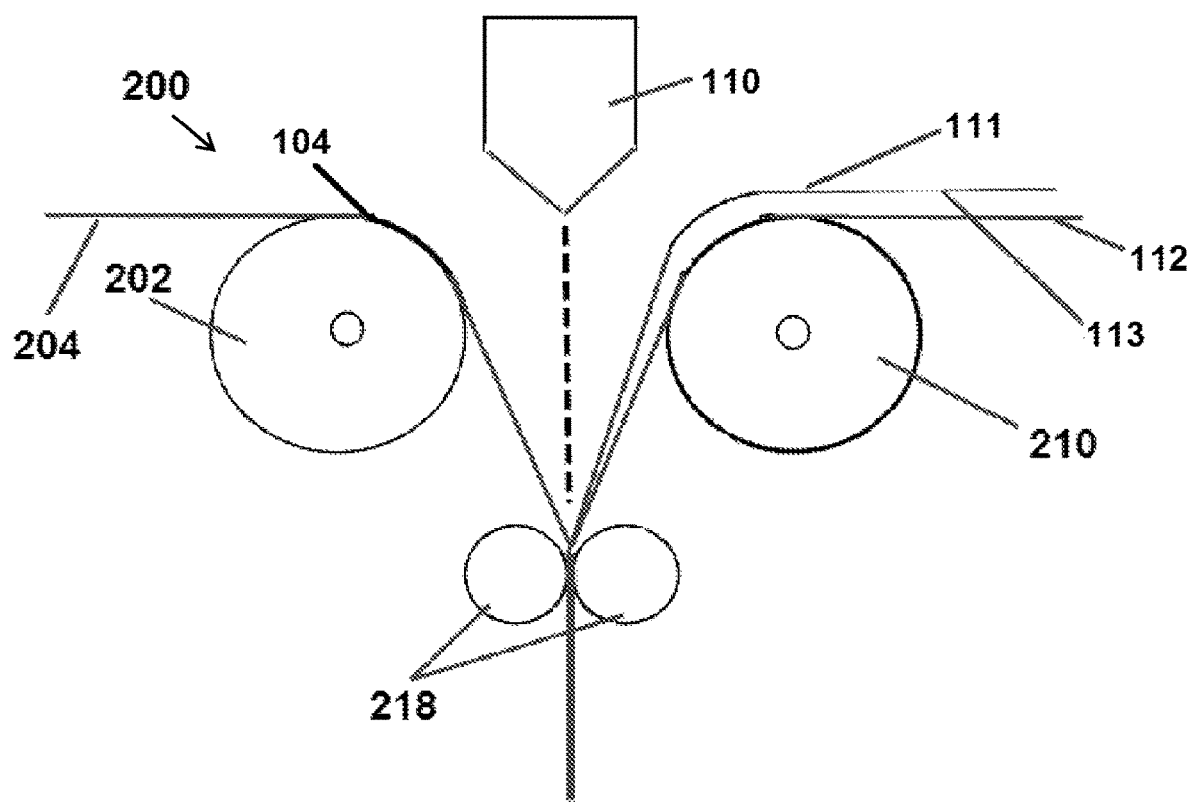
FIG. 2 shows a schematic illustration of an exemplary system and method for making a carpet tile as disclosed and described herein.

FIG. 2 shows exemplary line 200 for making a carpet 100 shown in FIG. 1. As shown in FIG. 2, a carpet greige goods 204 made by attaching a plurality of fibers to the primary backing component and extending from the face surface of the primary backing component are provided by roll 202, wherein the back surface of the primary backing component 104 is facing up. In some aspects, the primary backing component 104 is provided with a precoat layer disposed on the primary backing component. In this exemplary line, the disclosed secondary backing 112 and the reinforcement material 111 are directed from roll 210, wherein the secondary backing is disposed on a second surface 113 of the reinforcement material. It is understood to one of ordinary skill in the art that the secondary backing and the reinforcement material can be provided together or separately, and wherein the secondary backing and the reinforcement material can be provided by any technique known in the art. The disclosed adhesive composition 110 is applied to the back surface of the primary backing component, or a precoat layer, if present, and ultimately is positioned in contact with portions of the reinforcement material 111 and a face surface of the secondary backing 112. The greige good (with or without the precoat layer), the adhesive composition, the reinforcement material, and the secondary backing are passed between a set of nip rolls (or pinch rolls) 218 to co-laminate the reinforcement material and a secondary backing to the back surface of the primary backing component. Co-laminating of the secondary backing and the adhesive composition to the back surface of the primary backing component is performed such that as the first surface of the reinforcement material is adhered to the back surface of the primary backing component by the adhesive composition, the secondary backing material is disposed on the second surface of the reinforcement material and adhered to the back surface of the primary backing component by the adhesive composition. Thus, after a single co-laminating step, both the reinforcement material and the secondary backing material will be adhered to the primary backing component by the adhesive composition, which passes through the reinforcement material during the co-lamination step.

The adhesive composition can be provided by any means known to one of ordinary skills in the art, including, but not limited to, a dispensing apparatus, an extrusion station, a sprayer for a liquefied adhesive composition, or a lick roll rotating with a pan, which contains the liquefied adhesive composition. Nip rollers 218, may be heated by any means that are known to those having ordinary skill in the art to which the invention relates.

One skilled in the art will appreciate that, notwithstanding the particular examples described above, it is contemplated that the carpet may be produced by the processes known to those skilled in the art, including but not limited to direct coating and roll metering, and knife-coating and lick-roll application, as described in D. C. Blackly, *Latex and Textiles*, section 19.4.2, page 361, which is incorporated herein by reference.

C. Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A carpet tile comprising: (a) a greige good comprising: i) a primary backing component having a face surface and a back surface; and ii) a plurality of fibers attached to the primary backing component and extending from the face surface of the primary backing component; and (b) an adhesive layer having a first surface and an opposed second surface, wherein the adhesive layer comprises an adhesive composition and a reinforcement material that is at least partially embedded within the adhesive composition, wherein the first surface of the adhesive layer is applied to the back surface of the primary backing component; and (c) a secondary backing material adhered to the primary backing component by contact with the second surface of the adhesive layer, wherein the reinforcement material has opposed first and second sides that are spaced apart relative to a vertical axis, wherein the reinforcement material has an open structure that permits flow of the adhesive composition through the reinforcement material from the first side of the reinforcement material to the second side of the reinforcement material during co-lamination of the reinforcement material and the secondary backing material onto the adhesive composition, thereby embedding at least a portion of the reinforcement material within the adhesive composition and defining the adhesive layer.

Aspect 2: The carpet tile of aspect 0, wherein the plurality of fibers comprises a polyamide, an olefin, a polyester, or combinations thereof.

Aspect 3: The carpet tile of aspects 1 or 0, wherein the plurality of fibers are present in yarn.

Aspect 4: The carpet tile of any one of aspects 0-0, wherein a portion of the plurality of fibers are exposed at the back surface of the primary backing component.

Aspect 5: The carpet tile of any one of aspects 0-0, wherein the greige good comprises a precoat layer disposed between the back surface of the primary backing component and the adhesive layer, wherein the precoat layer at least partially encapsulates the plurality of fibers of the greige good.

Aspect 6: The carpet tile of aspect 0, wherein the precoat layer comprises latex.

Aspect 7: The carpet tile of aspect 6, wherein the precoat layer comprises SBR latex.

Aspect 8: The carpet tile of aspect 6, wherein the precoat layer comprises VAE latex.

Aspect 9: The carpet tile of aspect 6, wherein the precoat layer comprises EVA latex.

Aspect 10: The carpet tile of aspect 5, wherein the precoat layer comprises an acrylic material.

Aspect 11: The carpet tile of any one of aspects 6-10, wherein the precoat layer is provided at a coating weight ranging from about 10 to about 25 ounces/sq. yard.

Aspect 12: The carpet tile of any one of aspects 1-11, wherein the adhesive composition comprises a thermoplastic elastomer.

Aspect 13: The carpet tile of aspect 12, wherein the thermoplastic elastomer is a homogeneously branched ethylene polymer.

Aspect 14: The carpet tile of aspect 12, wherein the thermoplastic elastomer is a polyethylene elastomer.

Aspect 15: The carpet tile of aspect 12, wherein the thermoplastic elastomer is a polypropylene elastomer.

Aspect 16: The carpet tile of aspect 12, wherein the thermoplastic elastomer is an ethylene methyl acrylate (EMA) elastomer.

Aspect 17: The carpet tile of any one of aspects 12-16, wherein the adhesive composition is provided at a coating weight ranging from about 8 to about 30 ounces/sq. yard.

Aspect 18: The carpet tile of any one of aspects 12-17, wherein the adhesive composition comprises filler in an amount ranging from about 0% to about 80% by weight of the adhesive composition.

Aspect 19: The carpet tile of any one of aspects 1-18, wherein the reinforcement material of the adhesive layer comprises a fiberglass scrim.

Aspect 20: The carpet tile of any one of aspects 1-19, wherein the secondary backing material comprises a non-woven material.

Aspect 21: The carpet tile of aspect 20, wherein the non-woven material comprises a fleece material.

Aspect 22: The carpet tile of any one of aspects 1-21, wherein the secondary backing material comprises polypropylene, polyethylene terephthalate, polyethylene, or combinations thereof.

Aspect 23: The carpet tile of any one of aspects 20-22, wherein the secondary backing material comprises a spun-bond material.

Aspect 24: The carpet tile of any one of aspects 20-22, wherein the secondary backing material is needle-punched.

Aspect 25: The carpet tile of aspect 24, wherein the secondary backing material is heat-stabilized.

Aspect 26: The carpet tile of any one of aspects 20-22, wherein the secondary backing material comprises a point-bond material.

Aspect 27: The carpet tile of any one of aspects 1-19, wherein the secondary backing material comprises a woven material.

Aspect 28: A carpet tile comprising: a greige good comprising: i) a primary backing component having a face surface and a back surface; and ii) a plurality of fibers attached to the primary backing component and extending from the face surface of the primary backing component; and an adhesive layer having a first surface and an opposed second surface, wherein the adhesive layer comprises a thermoplastic adhesive composition and a reinforcement material that is at least partially embedded within the adhesive composition; a precoat layer disposed between the back surface of the primary backing component and the adhesive layer; and a secondary backing material adhered to the primary backing component by contact with the second surface of the adhesive layer, wherein the reinforcement material has opposed first and second sides that are spaced apart relative to a vertical axis, wherein the reinforcement material has an open structure that permits flow of the adhesive composition through the reinforcement material from the first side of the reinforcement material to the second side of the reinforcement material during co-lamination of the reinforcement material and the secondary backing material onto the adhesive composition, thereby embedding at least a portion of the reinforcement material within the adhesive composition and defining the adhesive layer.

Aspect 29: A method of making a carpet tile, comprising: (a) extruding an adhesive composition onto a back surface of a primary backing component of a greige good, the greige good further comprising a plurality of fibers attached to the primary backing component and extending from a face surface of the primary backing component; and (b) co-laminating a reinforcement material and a secondary backing material onto the adhesive composition, wherein the reinforcement material has an open structure and opposed first and second sides that are spaced apart relative to a vertical axis; (c) allowing the adhesive composition to flow through the reinforcement material from the first side of the reinforcement material to the second side of the reinforcement material such that the adhesive composition on the second side of the reinforcement material contacts the secondary backing material; and (d) cooling the adhesive composition to define an adhesive layer in which the reinforcement material is at least partially embedded within the adhesive composition, wherein the secondary backing material is adhered to the primary backing component by contact with the adhesive composition of the adhesive layer.

Aspect 30: The method of aspect 29, wherein the plurality of fibers comprises a polyamide, an olefin, a polyester, or combinations thereof.

Aspect 31: The method of aspect 29 or aspect 30, wherein the plurality of fibers are present in yarn.

Aspect 32: The method of any one of aspects 29-31, wherein a portion of the plurality of fibers are exposed at the back surface of the primary backing component.

Aspect 33: The method of any one of aspects 29-32, further comprising, prior to extrusion of the adhesive composition on the primary backing component, applying a precoat layer to the back surface of the primary backing component to at least partially encapsulate the fibers.

Aspect 34: The method of aspect 33, wherein the precoat layer comprises an acrylic material.

Aspect 35: The method of aspect 33, wherein the precoat layer comprises latex.

Aspect 36: The method of aspect 35, wherein the precoat layer comprises SBR latex.

Aspect 37: The method of aspect 35, wherein the precoat layer comprises VAE latex.

Aspect 38: The method of aspect 35, wherein the precoat layer comprises EVA latex.

Aspect 39: The method of any one of aspects 35-38, wherein the latex is provided at a coating weight ranging from about 10 to about 25 ounces/sq. yard.

Aspect 40: The method of any one of aspects 29-39, wherein the adhesive composition comprises a thermoplastic elastomer.

Aspect 41: The method of aspect 40, wherein the thermoplastic elastomer is a homogeneously branched ethylene polymer.

Aspect 42: The method of aspect 40, wherein the thermoplastic elastomer is a polyethylene elastomer.

Aspect 43: The method of aspect 40, wherein the thermoplastic elastomer is a polypropylene elastomer.

Aspect 44: The method of aspect 40, wherein the thermoplastic elastomer is an ethylene methyl acrylate (EMA) elastomer.

Aspect 45: The method of any one of aspects 40-44, wherein the adhesive composition is provided at a coating weight ranging from about 8 to about 30 ounces/sq. yard.

Aspect 46: The method of any one of aspects 40-45, wherein the adhesive composition comprises filler in an amount ranging from about 0% to about 80% by weight of the adhesive composition.

Aspect 47: The method of any one of aspects 40-46, wherein the secondary backing material comprises polypropylene, polyethylene terephthalate, polyethylene, or combinations thereof.

Aspect 48: The method of any one of aspects 29-47, wherein the reinforcement material of the adhesive layer comprises a fiberglass scrim.

Aspect 49: The method of any one of aspects 29-48, wherein the secondary backing material comprises a nonwoven material.

Aspect 50: The method of aspect 49, wherein the nonwoven material comprises a fleece material.

Aspect 51: The method of any one of aspects 48-50, wherein the secondary backing material comprises a spunbond material.

Aspect 52: The method of any one of aspects 48-50, wherein the secondary backing material is needle-punched.

Aspect 53: The method of aspect 52, wherein the secondary backing material is heat-stabilized.

Aspect 54: The method of any one of aspects 48-50, wherein the secondary backing material comprises a point-bond material.

Aspect 55: The method of any one of aspects 29-48, wherein the secondary backing material comprises a woven material.

Aspect 56: The method of any one of aspects 29-55, further comprising, following cooling of the adhesive composition, cutting the greige good, the adhesive layer, and the secondary backing material to form the carpet tile.

Aspect 57: The method of any one of aspects 29-56, wherein the greige good is provided at a first width greater than a width of the carpet tile, the method further comprising, following cooling of the adhesive composition: cutting the greige good, the adhesive layer, and the secondary backing material to a second width that is less than the first width; positioning a portion of the greige good, the adhesive layer, and the secondary backing material having the second width within a cutting machine configured to receive material having the second width; and operating the cutting machine to form the carpet tile from the portion of the greige good, the adhesive layer, and the secondary backing material within the cutting machine.

Aspect 58: The method of aspect 57, wherein the first width is about 12 feet, and wherein the second width is about 6 feet.

Aspect 59: The method of any one of aspects 29-58, wherein the adhesive composition is the only portion of the carpet tile that is extruded, and wherein the method does not comprise any additional extrusion steps.

What is claimed is:

1. A method of making a carpet tile, comprising:
   (a) extruding an adhesive composition onto a back surface of a primary backing component of a greige good, the greige good further comprising a plurality of fibers attached to the primary backing component and extending from a face surface of the primary backing component; and
   (b) laminating a reinforcement material onto the adhesive composition, wherein the reinforcement material has an open structure and opposed first and second sides that are spaced apart relative to a vertical axis, the open structure comprising a porous structure, a plurality of through-openings, or an open-mesh structure;
   (c) allowing the adhesive composition to flow through the open structure of the reinforcement material from the first side of the reinforcement material to the second side of the reinforcement material; and
   (d) cooling the adhesive composition to define an adhesive layer comprising the adhesive composition and the reinforcement material, wherein the reinforcement material is at least partially embedded within the adhesive composition,
   wherein the adhesive composition is applied to the back surface of the primary backing component and defines at least a portion of a first side of the adhesive layer, and wherein the reinforcement material and the adhesive composition each define respective portions of a second side of the adhesive layer opposite the first side of the adhesive layer.

2. The method of claim 1, further comprising, following cooling of the adhesive composition, cutting the greige good and the adhesive layer to form the carpet tile.

3. The method of claim 1, wherein the greige good is provided at a first width greater than a width of the carpet tile, the method further comprising, following cooling of the adhesive composition:
   cutting the greige good and the adhesive layer to a second width that is less than the first width;
   positioning a portion of the greige good and the adhesive layer having the second width within a cutting machine configured to receive the greige good and the adhesive layer having the second width; and
   operating the cutting machine to form the carpet tile from the portion of the greige good and the adhesive layer within the cutting machine.

4. The method of claim 3, wherein the first width is about 12 feet, and wherein the second width is about 6 feet.

5. The method of claim 1, wherein no portion of the carpet tile other than the adhesive composition is extruded, and wherein the method does not comprise any additional extrusion steps.

6. The method of claim 1, wherein the plurality of fibers comprises a polyamide, an olefin, a polyester, or combinations thereof.

7. The method of claim 1, wherein the plurality of fibers are present in yarn.

8. The method of claim 1, wherein a portion of the plurality of fibers are exposed at the back surface of the primary backing component.

9. The method of claim 1, further comprising:
   applying a precoat layer between the back surface of the primary backing component and the adhesive layer, wherein the precoat layer at least partially encapsulates the plurality of fibers of the greige good.

10. The method of claim 9, wherein the precoat layer comprises latex.

11. The method of claim 9, wherein the precoat layer comprises an acrylic material.

12. The method of claim 9, wherein the precoat layer is provided at a coating weight ranging from about 10 to about 25 ounces/sq. yard.

13. The method of claim 1, wherein the adhesive composition comprises a thermoplastic elastomer.

14. The method of claim 13, wherein the adhesive composition is provided at a coating weight ranging from about 8 to about 30 ounces/sq. yard.

15. The method of claim 13, wherein the adhesive composition comprises filler in an amount ranging from about 0% to about 80% by weight of the adhesive composition.

16. The method of claim 1, wherein the reinforcement material of the adhesive layer comprises a fiberglass scrim.

17. The method of claim 1, wherein the reinforcement material comprises a porous fiberglass mat.

18. The method of claim 1, wherein the adhesive composition comprises a blend of homogeneously branched ethylene polymer and substantially linear ethylene polymer.

19. The method of claim 1, wherein the adhesive layer includes only a single extruded layer.

20. The method of claim 1, wherein the adhesive composition is applied as a single layer, wherein the reinforcement layer and the primary backing component approach a convergence between two nip rollers, wherein the single layer is applied at the convergence between the two nip rollers.

\* \* \* \* \*